United States Patent [19]

Windsor

[11] Patent Number: 5,168,173
[45] Date of Patent: Dec. 1, 1992

[54] PUSHLESS TWO-HAND RUN BAR APPARATUS

[75] Inventor: David E. Windsor, Fenton, Mich.

[73] Assignee: Control Devices, Inc., Flint, Mich.

[21] Appl. No.: 519,135

[22] Filed: May 4, 1990

[51] Int. Cl.$^5$ .............................................. H01H 9/00
[52] U.S. Cl. ................................... 307/139; 307/116;
   307/113; 192/129 A; 192/131 R
[58] Field of Search ............... 307/112, 115, 116, 117,
   307/119, 139; 192/129 R, 129 A, 130, 131 R

[56] References Cited

U.S. PATENT DOCUMENTS

| | | | |
|---|---|---|---|
| 4,054,935 | 10/1977 | Ginsberg | 361/189 |
| 4,091,438 | 5/1978 | Olding et al. | 307/113 |
| 4,412,268 | 10/1983 | Dassow | 361/189 |
| 4,918,560 | 4/1990 | Storer | 361/190 |
| 4,939,358 | 7/1990 | Herman et al. | 361/189 |

OTHER PUBLICATIONS

Allen-Bradley Industrial Control Catalog, circa 1981, p. 230, Detroit District Office, 32660 Stephenson Hwy., Madison Hts., Mich. 48071, (313) 583-9400.

Syrelec Sales Brochure, circa 1985, pp. 172-173, 2445 Midway Rd. Carrolton, Tex. 75006-2503, 214/250-1647. C-18 Series Photo-Electric Cells.

DataLogic Sales Catalog, circa 1989, pp. 31-36, Mac-Gregor Park, 301 Gregson Dr., Cary, N.C. 27511, (919)481-3002.

Baumer Electric Sales Catalog, circa 1991, pp. 1.42-1.44 & 5.2-5.12; 122 Spring St. #C-6, Southington, Conn. 06849.

Colorado Electro Optics 1P-37 Installation Instructions, circa 1985, pp. 1-5, 2200 Central Ave., Boulder Colo. 80301, (303)494-3200, Serial No. 8111-520.

*Primary Examiner*—Jeffrey A. Gaffin
*Attorney, Agent, or Firm*—Harness, Dickey & Pierce

[57] ABSTRACT

A two-hand operator's control station mounted on a common enclosure detects an operator's hands and provides output signals without requiring the operator to push buttons. Such control stations, called pushless run bars, are for use with automatic machinery which requires the simultaneous use of two hands to initiate operation of the machinery. In each embodiment of the present invention, two hand-sensing mechanisms are provided on or near the cover of an elongated enclosure, one for sensing each hand. The sensing mechanisms are located sufficiently far apart, near opposite ends of the run bar enclosure, to prevent accidental operation by one hand. Suitable anti-tie-down circuitry, an electrical cover interlock, indicator lights, and physical barriers to prevent access from certain directions may also be provided as part of the apparatus. A first embodiment of the run-bar apparatus employs two separate photo-transceiver units for detecting the operator's two hands. A second run bar employs two capacitive sensor units for detecting the operator's hands. A third run bar employs two passive infra-red intrusion devices to detect the operator's hands. A fourth embodiment employs two ultrasonic sensing systems to detect the operator's hands. A fifth run bar employs passive infrared intrusion devices to detect the presence of the operator's hands. A third sensor may be provided to detect the operator's body in front of the run bar.

31 Claims, 7 Drawing Sheets

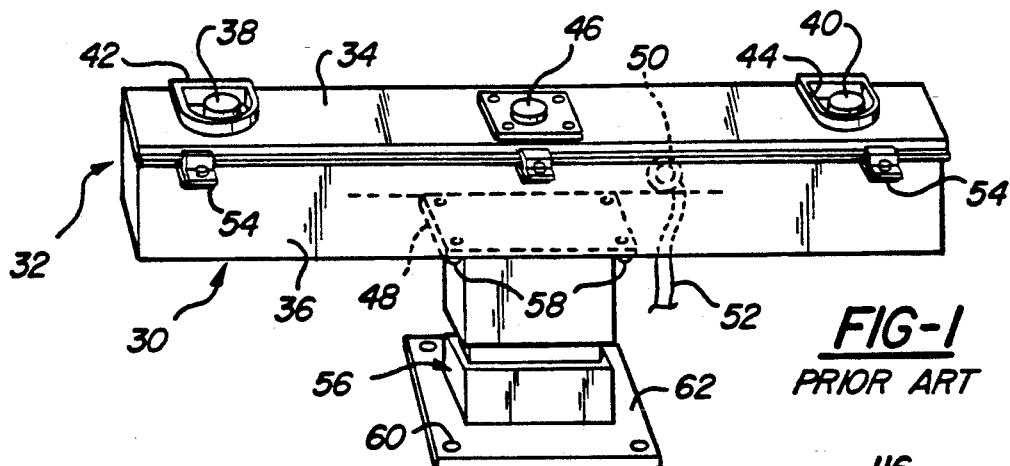
FIG-1 PRIOR ART
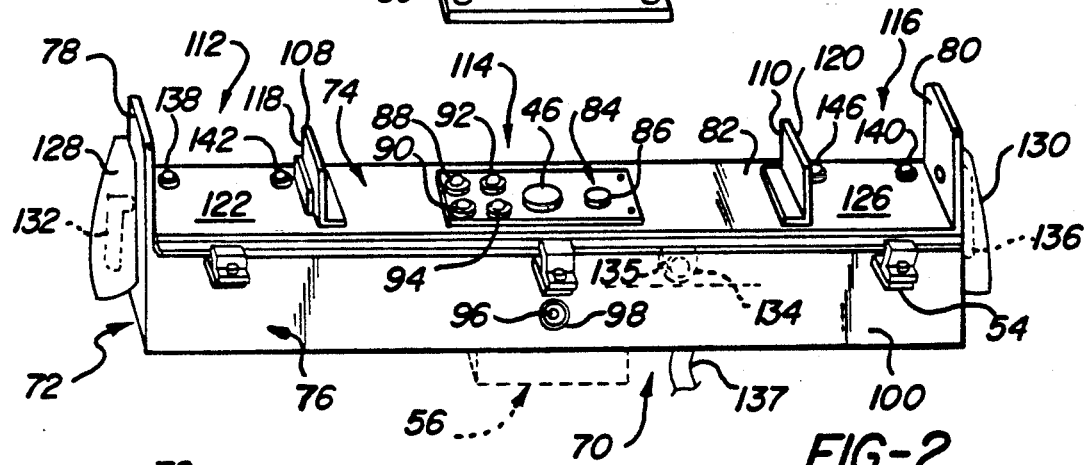
FIG-2
FIG-3

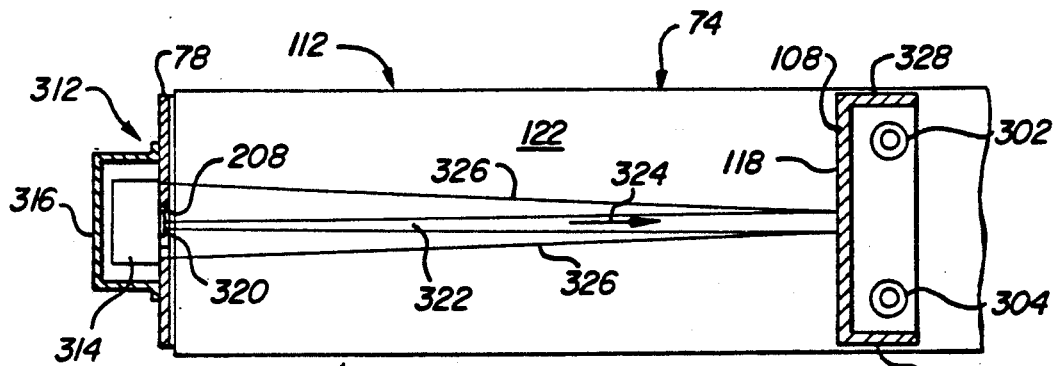
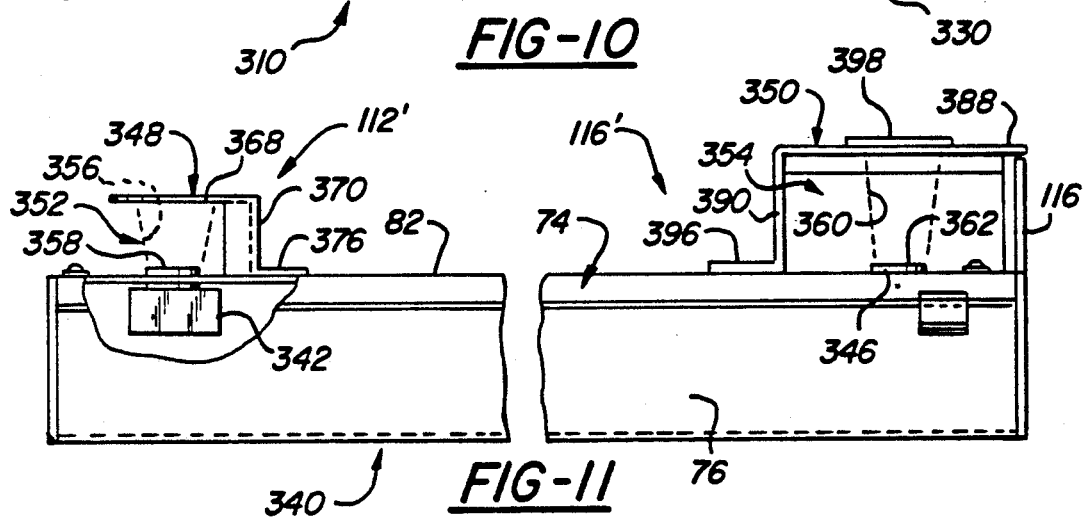
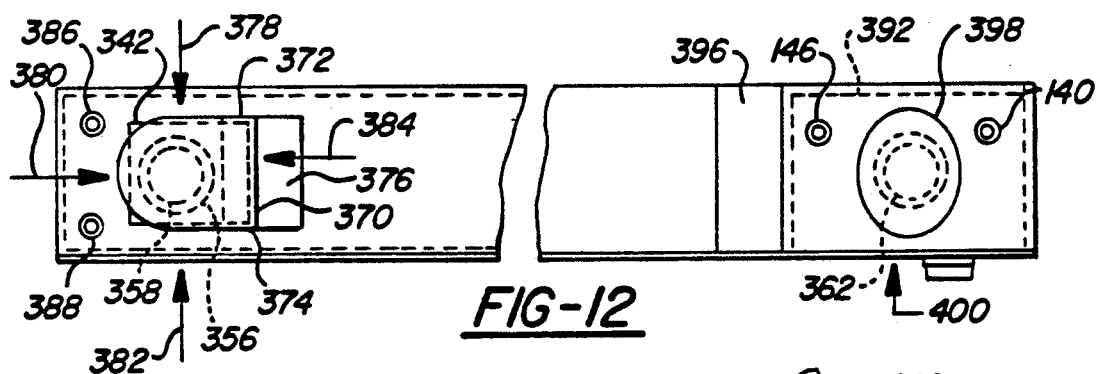
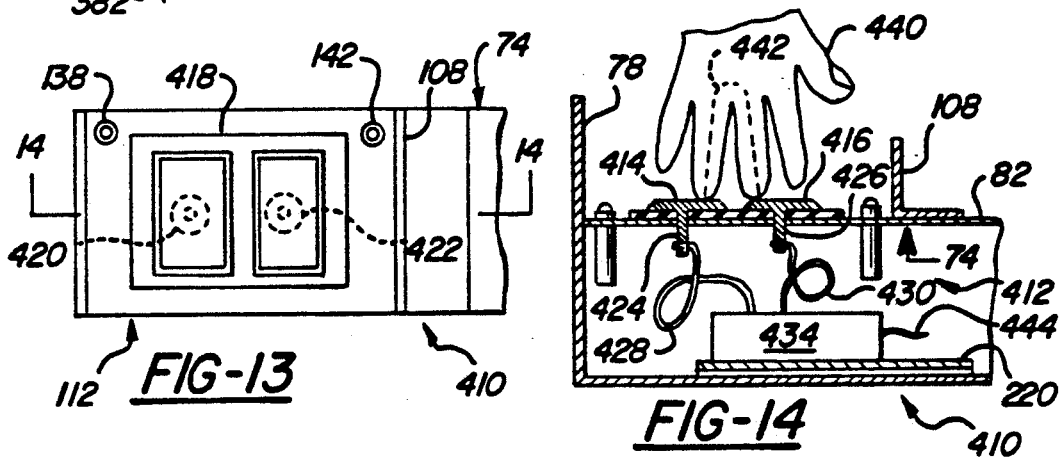

PUSHLESS TWO-HAND RUN BAR APPARATUS

BACKGROUND OF THE INVENTION

1. Field of the Invention

The present invention relates in general to operator stations having two control devices mounted on a common enclosure which must be actuated by two hands, and in particular to two-hand operator stations mounted on a common enclosure which do not require mechanical force to operate because a pushless sensing device is used to sense each hand.

2. Discussion

Run bars produce one or more electrical start signals for an automatic machine when the two spaced-apart buttons located on the run bar are simultaneously depressed. Conventional run bars, such as the type shown in FIG. 1, may be used with virtually any kind of automatic machine, from mechanical or hydraulic power presses, to assembly machines, transfer machines, milling machines, broaching or grinding machines, welding machines, or materials handling equipment, testing machines, and the like. The term "automatic machine" as used herein thus includes any type of machinery or industrial equipment which is automated in whole or in part. By "automated in whole or part," I mean that one or more functions or motions of the machinery or equipment are performed with the assistance of some form of non-human energy. Such energy could be electricity, hydraulic or pneumatic energy, photonic power such as laser beams or other concentrated light, magnetic or chemical energy, mechanical energy, or still other forms of energy.

Conventional run bars, such as the type shown in FIG. 1, are typically used in three different situations involving automatic machines. First, for an automatic machine that is operated by or attended to by one person, only one rub-bar is used. Second, for an automatic machine operated by or attended to by two or more persons simultaneously, one run-bar will be provided for each person. In order to initiate the cycle or sequence of automatic operations, all of the operators must simultaneously actuate their respective run bars, to ensure that the hands of all of the operators are in a safe position, i.e., on the run bars. Third, there are certain kinds of automatic machines where the machines run continuously once started, but nevertheless are manually loaded and/or unloaded with parts or materials. Where such machine has a pinch point or other hazard during each cycle of the machine or each cycle of its load/unload mechanism, the operator is normally required to place his or her hands on the buttons of run bar during a certain portion of the machine's cycle when a pinch point or other hazard exists. In this situation, the run bar provides one or more signals which indicate to the control system of the automatic machine that the machine may continue running. Thus, it should be understood that the phrase "operating an automatic machine" is also used very broadly herein and is intended to include at least all of the following: (1) initiating a cycle, a sequence of one or more operations of cycles of the automatic machine; (2) participating in initiating a cycle, or sequence of one or more automatically performed operations or cycles of a machine; and (3) providing one or more signals to permit an automatic machine to continue to operate automatically.

FIG. 1 shows a conventional run bar apparatus commercially available from Control Devices, Inc. of Flint, Mich., the assignee of the present invention. This run bar 30 includes an elongated enclosure assembly 32 comprised of a cover 34 and base cabinet 36, left and right heavy-duty palm buttons 38 provided with metal guard rings 42 and 44, and an unguarded stop button 46 mounted in the center of the cover 34. The run bar also includes a four-hole mounting plate 48 located on the underside of the base cabinet 32 and an electrical connector assembly 50 including an electrical cable 52 which is mounted on the backside of the base cabinet 32. Conventional self-retaining screw-operated cover clamps 54 are also provided for holding the hinged cover 34 in its closed position on top of the cabinet 32. The run bar 30 may be supported at any desired height convenient for the operator by use of a pedestal 56 which is fastened to the four-hole mounting plate 48 by suitable fasteners such as bolts 58. The pedestal 56 may be fastened to the floor with lag bolts passing through holes 60 in the base 62 of the pedestal 56.

Machine designers and suppliers typically specify heavy-duty palm buttons for run bars, because they are subject to heavy use. Also, most suppliers of such palm buttons prefer to put fairly strong return springs in the buttons to help them last in heavy-duty use environments. This tends to increase the effort required to be exerted by operators.

One complaint made by some workers who use run bars is that the repetitive motion of pressing the buttons of a run bar can generate fatigue. Also, some workers claim that such repetitive motion with their hand aggravates a medical condition called Carpal Tunnel Syndrome. This condition is an inflammation associated with the naturally lubricated sheathing of the tendons within the wrists, which results in pain when such tendons in the sheathing are moved.

In light of the foregoing problems, it is an object of the present invention to provide a two-hand run bar apparatus which does not require any pressure or force from the operator's hands to actuate. It is a related object of the present invention to provide a run bar which does not even need to be physically touched in order to operate.

It is still another object of the present invention to provide a run bar which detects the present of the operator's hands in the hand actuation regions of the run bar without requiring the operator to overcome a mechanical spring force. It is a further object of the present invention to provide another two-hand run bar which only needs to be contracted very lightly to operate.

SUMMARY OF THE INVENTION

In light of the foregoing problems and in order to fulfill one or more of the foregoing objects, the present invention provides several different novel run bar apparatuses. Each such run bar uses a separate "pushless" sensing device to determine whether an operator's hand is present in the actuation region of the run bar. A pushless sensor is a sensor that does not require that any mechanical force be applied against the run bar in order to have the run bar detect the presence of an operator's hand in the hand actuation region. Different non-contact sensors may be used to detect the presence of an operator's hand within a predetermined "actuation region" of the run bar, including optical sensors, capacitive sensors, ultrasonic sensors, and passive infrared intrusion sensors. Each of the foregoing sensors is a "non-contact sensor," in that it need not be physically touched in order to operate. The capacitive sensor may also be adjusted so that it must be touched lightly (but need not be pushed with any significant manual force) in order to operate. Another pushless sensor which must be touched in order to operate is an electrical resistance sensor set up to detect when the actual resistance between two predetermined surface locations in an actuation region of a run bar falls below a predetermined minimum value.

According to the present invention, there is provided several different styles of run bar using different selected ones of the foregoing pushless sensors. In each of the presently preferred run bars described below, the two pushless sensors used in each run bar are identical and are mounted on a common, elongated enclosure assembly having a generally rectangular elongated cover and a base cabinet having at least one internal chamber located under the cover. The elongated cover preferably has a generally planar exterior surface and may have dividers which separate the cover into left, central and right sections, with the left and right sections being spaced about by at least about 30 centimeters (cm). Hinges may be provided near one of the top edges of the base cabinet for interconnecting the cover and cabinet, so that the cover may be pivoted between a closed position and an open position.

Left and right outer guard flanges may respectively be provided to help define the outer bounds of the left and right hand actuation regions. These flanges preferably extend above the cover from the left and right ends of the base cabinet. The dividers for partitioning the cover into left, central and right sections preferably include left and right inner guard flanges which each have a substantially vertical surface extending at least 2 cm above the surface of the cover. The vertical surfaces of these inner flanges are preferably located no more than about 20 cm from the left and right outer guard flanges, respectively. This defines a left-hand actuation region located between the left inner and outer guard flanges, and a right-hand actuation region located between the right inner and outer guard flanges. A pushless sensor is located at least in part in the vicinity of the left-hand actuation region, for sensing whether a human hand is present in the immediate vicinity directly above the left section of the cover. This pushless sensor includes a means for generating a first signal indicating whether such a hand is present. Similarly, a second pushless sensor is located at least in part in the vicinity of the right-hand actuation region, for sensing whether another human hand is present in the immediate vicinity directly above the right section of the cover. The second pushless sensor also includes means for generating a second signal indicating whether a hand is present. If desired, one or two indicator lights may be provided in each hand actuation region for indicating whether or not the pushless sensor located in the actuation region detects an object.

In a first run bar of the present invention, optical sensing means, such as a retro-reflective photo-transceiver, is used as the each of the two pushless sensors. One such photo-transceiver is preferably mounted to each outer guard flange and protects an optical beam through an aperture thereof. A prismatic reflector may be mounted on the adjacent inner guard flange to bounce the beam back toward the photo-transceiver, where it is detected. The presence of an operator's hand is detected by breaking the optical beam produced by this sensor.

A second run bar of the present invention used capacitive sensors, which may be mounted in the cover of the enclosure assembly.

A third run bar of the present invention utilizes an ultrasonic sensing systems for its pushless sensors. Either thru-beam ultrasonic sensors or retro-reflective ultrasonic sensors may be used.

A fourth run bar of the present invention uses a passive infrared intrusion sensor to detect each of the operator's hands. A thermally opaque guard is preferably used in connection with each sensor to avoid the passive intrusion sensor from falsely triggering on a distant object which is not an operator's hand.

The fifth run bar of the present invention employs electrical resistance sensors mounted on the cover of the enclosure assembly to detect each hand of the operator. When the cover of the enclosure assembly is made from a conductive material such as sheet metal, the individual sensors should be electrically insulated from the cover. In all versions of run bars of the present invention, guarding or shielding the hand actuation regions may be provided. Additionally, a third non-contact sensor may be provided on each enclosure assembly to detect the presence of a person adjacent to the run bar, if desired.

The enclosure assembly of each run bar provides protected space within for electrical wiring, electrical terminal strips and other electrical components if used such as anti-tie-down circuitry. An electrical interlock switch is preferably provided to prevent operation of the two-hand run bar apparatus of the present invention when the cover is not in its closed position.

These and other objects, advantages and aspects of the present invention may be further understood by referring to the detailed description, accompanying Figures, and appended claims.

BRIEF DESCRIPTION OF THE DRAWINGS

The drawings form an integral part of the description of the preferred embodiments and are to be read in conjunction therewith. Like reference numerals designate the same or similar components or features in the various Figures, where:

FIG. 1 is a front perspective view of a prior art, two-hand run bar apparatus having an elongated rectangular enclosure, shown mounted on a pedestal;

FIG. 2 is a front perspective view of a first run bar of the present invention which utilizes two retro-reflective photo-transceiver units, with one such unit being used to detect the presence of each hand of an operator;

FIG. 3 is an enlarged, fragmentary view of the left-hand end portion of the FIG. 2, shown in partial cross-section to reveal a preferred location and construction of the retro-reflective photo-transceiver;

FIG. 10 is a top view of the left-hand portion of another variation of the third run bar of the present invention which utilizes a retro-reflective ultrasonic system to detect an operator's hand;

FIG. 11 is a fragmentary front view of a fourth run bar of the present invention which employs a passive infrared intrusion sensing device to detect each hand of the operator, and includes mechanical guards to prevent access to the respective hand actuation regions, except from certain predetermined directions;

FIG. 12 is a top view of the FIG. 11 run bar;

FIG. 13 is a fragmentary perspective view of a fifth run bar of the present invention which utilizes contact-type high resistance strips for sensing an oeprator's hand;

FIG. 14 is a side cross-sectional view taken along line 14—14 of FIG. 12;

DETAILED DESCRIPTION OF THE PREFERRED EMBODIMENTS

Figure 15:
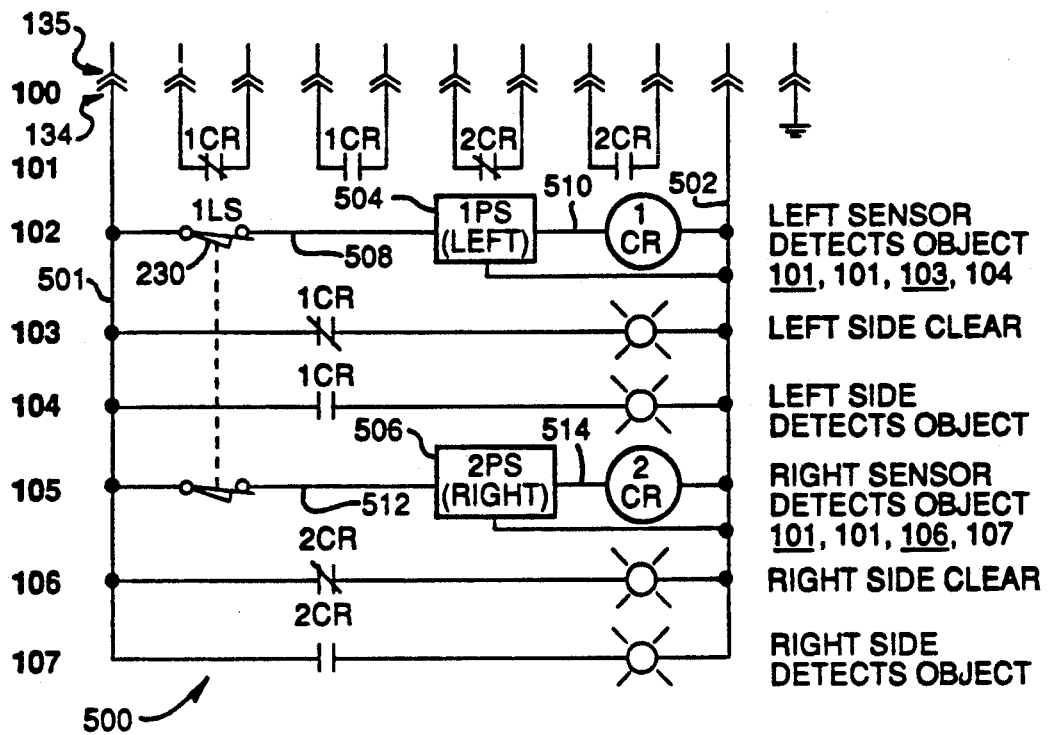
FIG. 15 is a first control circuit used in the various run bars of the present invention.
Figure 17:
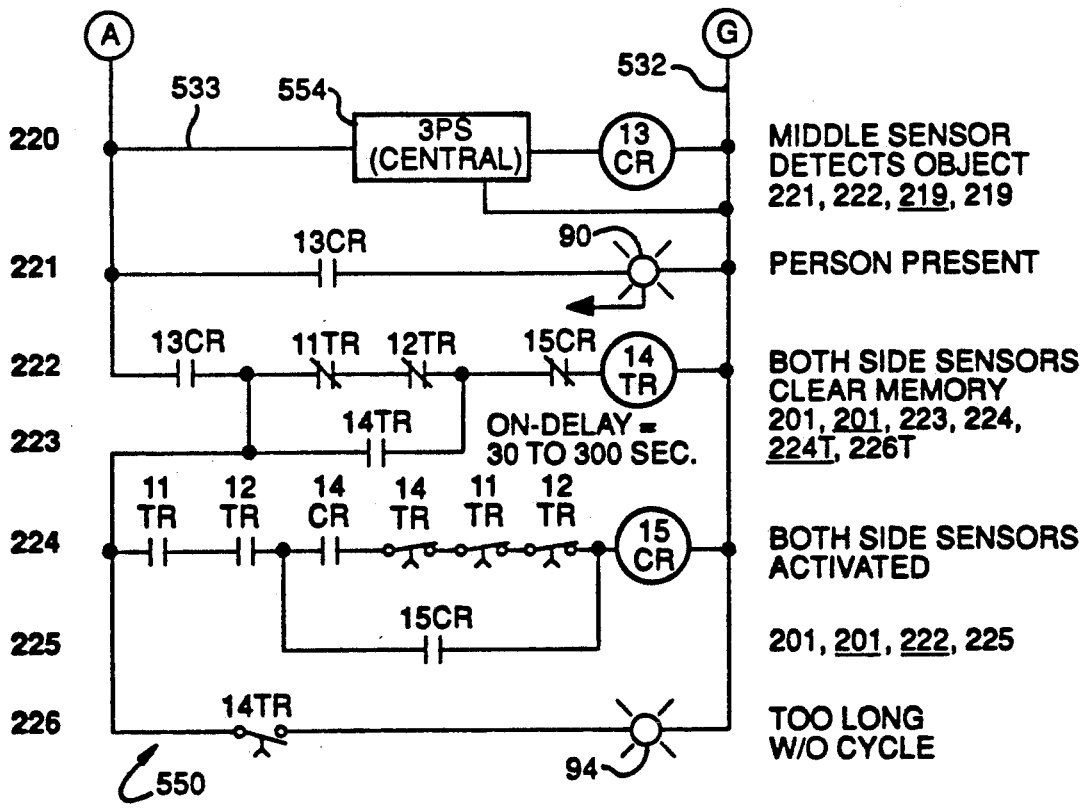
FIG. 17 is an additional control circuit used in conjunction with the FIG. 16 circuit for monitoring a third sensor that senses the presence of a person in front of a run bar of the present invention.
Figure 16:
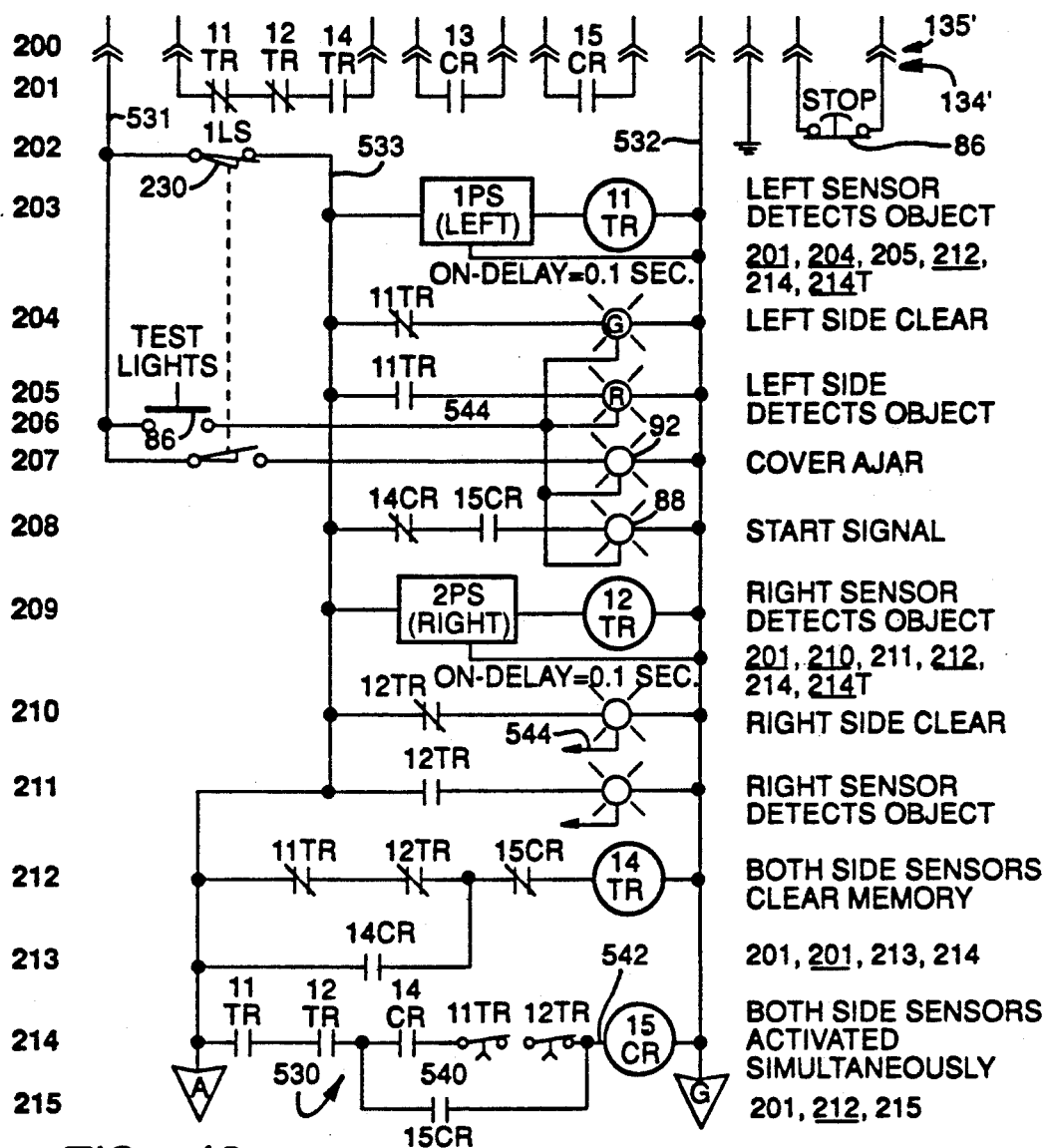
FIG. 16 is a second control circuit used in the various run bars of the present invention.

FIGS. 2 through 6 show various views of a first preferred run bar apparatus 70 of the present invention which employs optical sensors for detecting the presence of the operator's hands in a manner which will be described below. FIG. 2 is a front perspective view which shows that the run bar 70 includes an elongated enclosure assembly 72 having an elongated cover 74 which closes up the open top of an elongated base cabinet 76 that has left and right outer guard flanges 78 and 80 extending upwardly above the planar surface 82 of the cover 74. The cover 74 may optionally include a removable plate 84 upon which may be mounted one or more of the following devices: a stop pushbutton 46, a "test lights" button 86 and four indicator lights 88 through 94 which respectively indicate when illuminated — "start signal produced," "person present in front of the run bar," "cover ajar" and "too long without cycle." How the button 86 indicator lights 88-94 function will become clear when the control circuits of FIGS. 15-17 are discussed below. An optional non-contact "person present" sensor 96 protected by an optional guard ring 98 may also be provided on the front surface 100 of the base cabinet 76. The sensor 96 may be a retro-reflective photo-transceiver of the type which will be shortly discussed.

Cover 74 also preferably includes divider means, namely, left and right inner guard flanges 108 and 110 which, for dividing the cover into a left section 112, a central section 114 and a right section 116. The left and right inner guard flanges 108 and 110 each have a substantially vertical surface 118 and 120 extending at least 2 cm and preferably about 5 cm above the surface 82 of the cover 74. Left inner and outer flanges 78 and 108 are preferably located about 15 cm to no more than about 20 cm from each other, and provide left and right boundaries for a surface portion 122 of the cover 74. The area in the immediate vicinity above surface 122 and between inner and outer flanges 78 and 108 may be called the left-hand actuation region, since when the operator places his hand in this region, a left-hand sensor, shown and described with respect to FIGS. 3 through 5, will detect his hand. Similarly, the vertical surfaces of right outer and inner guard flanges 80 and 110 define a surface portion 126 of cover 74. The region immediately above surface 126 and between flanges 80 and 110 constitutes the right-hand actuation region.

The run bar 70 shown in FIG. 2 also includes left and right protective covers 128 and 130 mounted on the outside of outer flanges 78 and 80 respectively, for substantially enclosing retro-reflective photo-transceivers 132 and 136, shown in simplified dotted line form thereunder. The run bar 70 also includes an electrical connector 134 fastened to the backside of cabinet 76, and conventional clamps 54 which hold the hinged cover 74 in its closed position. Indicator lights 138 and 140 are respectively illuminated when no object is detected within the hand actuation regions 112 and 116. Indicator light 142 is illuminated when an object is detected by sensor 132 in left-hand actuation region of section 112. Similarly, indicator light 146 is illuminated when an object is detected by sensor 136 in the right-hand actuation region of section 116. The left and right sections and components are essentially identical, but are arranged in mirror-image fashion, thus providing a nicely balanced symmetry to the over-all design of the run bar 70. Thus, to understand the details of this first run bar (and other run bars) of the present invention, it is only necessary to show and discuss the left section of each run bar.

FIG. 3 is an enlarged view of the left end of run bar 70 shown in FIG. 2, from a front view with the outer flange 78 and sensor cover 128 shown in cross-section to reveal the arrangement of retro-reflective optical sensor 132. The cover 128 is sufficiently large to completely cover the retro-reflective unit 132, and is attached to outer flange 78 via sheet metal screws 158 which pass through oil-tight sealing gasket 160. The cover 128 may be made of a metal or plastic. The retro-reflective sensor 132 has horizontal cylindrical portion 162 and vertical cylindrical portion 164 that is held in place by mounting clamp 166 having a cylindrical bore 168, which is clamped upon annular gasket 170 and resiliently holds the optical sensor 132 in place. The optical sensor 132 has an electrical cable 172 extending from the bottom thereof through a hole in the outer flange 78 which is sealed by grommet 174. The bottom part 178 of the cover is open, thus allowing cover 128 to serve as a convenient carrying handle by which to manually transport the run bar 70.

FIG. 3 also shows that a plastic, prismatic reflector 180 is mounted to surface 118 of the inner guard 108. The dashed line 182 shows the line-of-sight path of the optical beam across actuation region 112 to the reflector 180 where it bounces back toward the photo-transceiver 132. The dashed oblong object 184 represents a cross-section of a human hand placed upon surface 122, and clearly it would break the beam 182. Note that the width of section 122 is easily large enough to accommodate the human hand, since it is about 50% wider than an average adult male's hand. Thus, an operator will not have to aim too carefully in order to break the beam 182 with his palm or with his fingers. This open, easy-to-use, but still guarded arrangement of the actuation regions on the run bar 70 is an advantage in high-volume production situations, and still prevents accidental operation.

Figure 4:
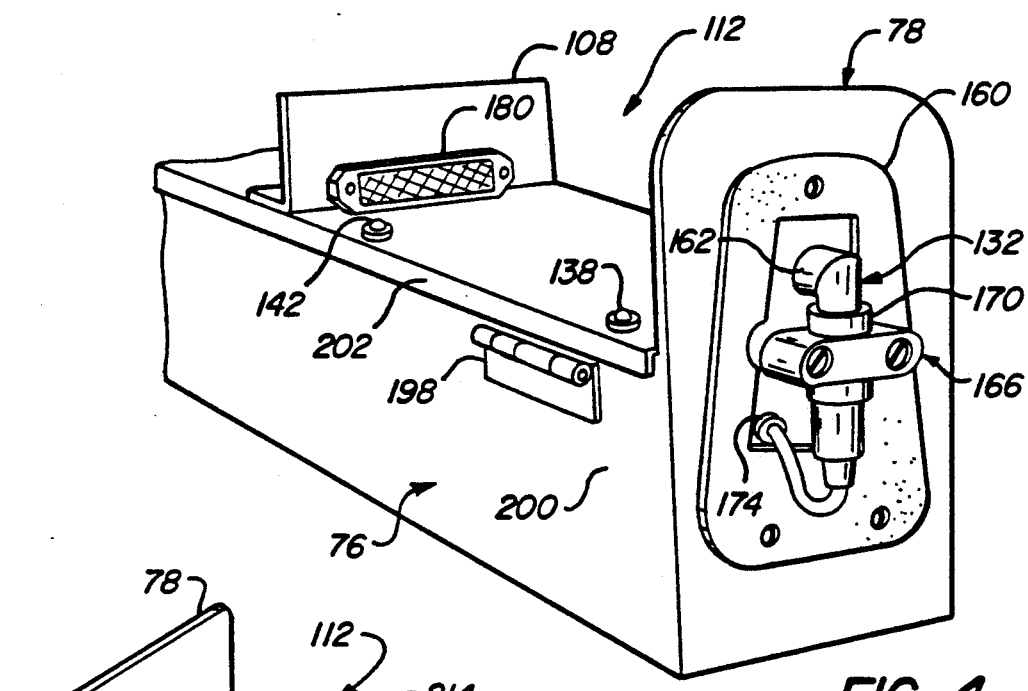
FIG. 4 is an enlarged fragmentary view of the right-hand portion of the FIG. 2 apparatus.

FIG. 4 shows the left-hand actuation region 112 from a rear perspective view with the cover 128 removed in order to show the mounting block 166 for the optical transceiver 132. Also, FIG. 4 shows the hinge 198 connecting the back surface 200 of the base cabinet 76 to the side lip 202 of the cover. The hinge 198 may be of piano hinge construction, and the hinge halves may be spot-welded to the surfaces to which they are attached.

Figure 5:
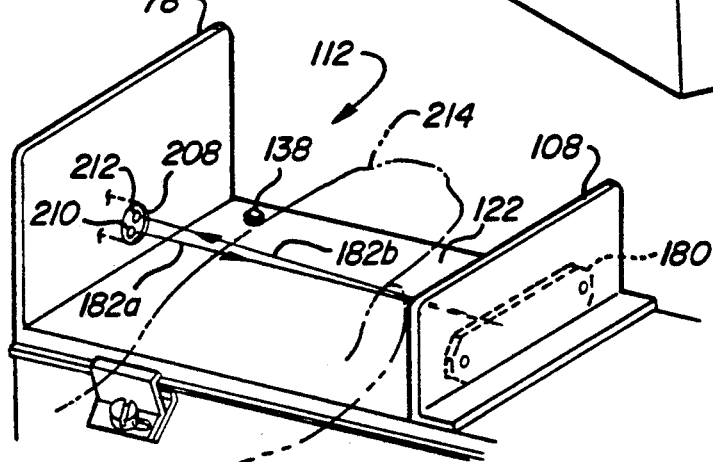
FIG. 5 is a view of the fragmentary perspective view of the left-hand portion of the FIG. 2 apparatus, illustrating the path of the optical beam of the transceiver unit, and how an operator's hand fits between the inner and outer guard flanges.

FIG. 5 shows the left-hand actuation region from an inside front perspective view. An aperture 208 is provided in the outer flange 78 and is concentrically arranged relative to the cylindrical sensor body portion 162 so that the sensor's photoemitter 210 and photoreceiver 212 on the ends of the body portion 162 are visible through the aperture 208 as shown. Accordingly, a beam 182a emanates from the emitter 210 toward the reflector 180 and bounces back as shown by dashed line 182b, where it is received by photo-receiver 212. An operator's left hand is shown in phantom by dashed lines 214. Clearly the hand will block the beam 182 when lowered near to the surface 122 of hand actuation region 112. Suitable retro-reflective photo-transceivers for use in the run bar 70 are the C-18 Series photo-electric sensors from Syrelec Corporation of Carrollton, Tex. This same series of sensors also includes thru-beam sensors, which could be used in run bar 70 instead of retro-reflective sensors. Such a thru-beam ultrasonic sensing system is shown and discussed in FIG. 9 below.

Figure 6:
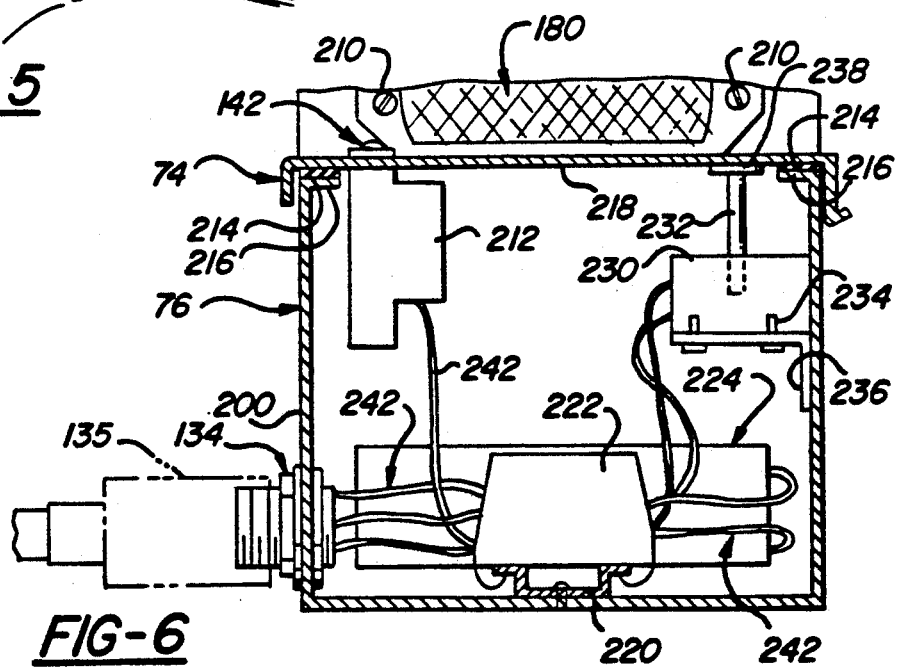
FIG. 6 is a cross-sectional view of the FIG. 2 enclosure taken along line 6—6 of FIG. 2, showing an indicator light and preferred location of the internal components.

FIG. 6 is a fragmentary view of the enclosure assembly 72 taken along the line 6—6 of FIG. 3. As best shown in FIG. 6, the prismatic reflector 180 may be mounted inner flange 108 by any suitable means such as sheet metal screws 210 or adhesive. The prismatic reflector may be of the type normally used on bicycle pedals or automobile taillights. Alternatively, the reflector 180 may be omitted altogether, as long as the surface 118 is sufficiently smooth and reflective to allow enough of beam 182a to bounce back to and be reliably detected by receiver 212.

The indicator light assembly 142 is conventional and includes a housing 212 which may contain a miniature transformer to operate the small bulb of the indicator light a lower voltage for longer life. Any suitable industrial indicator light may be utilized, including press-to-test lights, and those using incandescent bulbs or LEDs. FIG. 6 also shows that a conventional multiple-pin electrical connector may be thru-mounted in an appropriate hole punched through the back surface 200 of cabinet 76 and a suitable commercial connector may be used. The enclosure assembly preferably is made oil-tight (NEMA 12 or 13 rating) by use of suitable flexible gaskets 214 disposed between the upper inside flanges or edges 216 of the cabinet 76 and the inside surface 218 of the cover.

The enclosure may also include a terminal mounting strip 220 and a row of terminal blocks 222, and additional relays or electronic circuit devices represented by block 224. These devices may also be mounted, if desired, upon the strip 220, or may be mounted on a subplate (not shown) in the bottom of enclosure 76.

A cover interlock arrangement is provided by an electrical safety switch 230 and actuator fingers 232 which positively make and break the electrical contacts of the switch 230. The switch 230 is held in place by fasteners 234 passed through a suitable retaining means such as flange 236. The rigid fingers 232 are integrally connected to a base member 238 attached to the surface 218 by any suitable means including screws or welding. Thus, when the cover opens, the fingers 232 are drawn out of the safety switch 230 and positively force the electrical contacts therein to change state. When the fingers 232 are fully inserted into the safety switch 232, an internal switch is actuated, and completes the circuit, as will later be described. One suitable safety switch is the "Guardmaster Trojan" miniature safety switch available from E.J.A. Engineering Co., Ltd. of Lancashire, England.

Wires 242 are shown extending from the terminal blocks to the various components within the enclosure assembly 76. The strip of terminal blocks 222 provides for a convenient method for neatly wiring the various components therein for ease of assembly and troubleshooting, but may be completely eliminated if desired by directly wiring the connector and various components together as required to complete the circuits therein.

Figure 7:
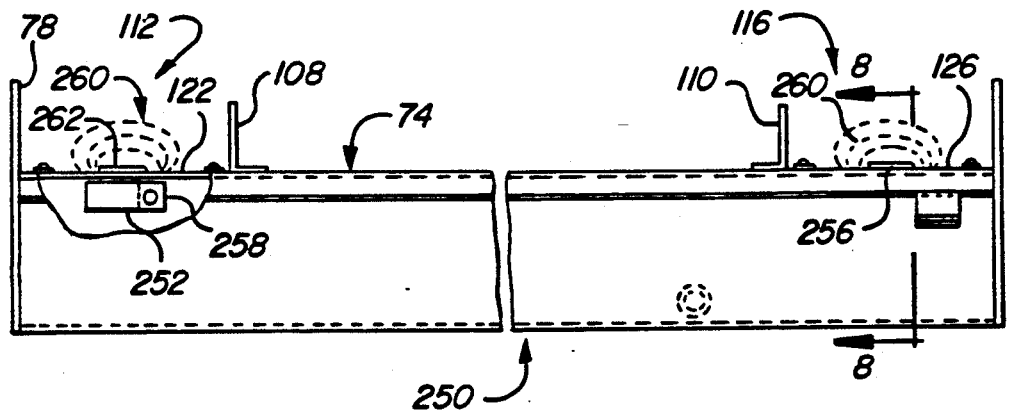
FIG. 7 is a simplified front view of a second run bar of the present invention which utilizes two capacitive sensor units, with one such unit being used to detect the presence of each hand of an operator.

FIG. 7 shows a second run bar of the present invention from a front view. The central section (not shown) of run bar 250 may be like central section 114 shown in FIG. 2 if desired. The run bar 250 utilizes two non-contact capacitive sensing devices 252 and 256 respectively centrally located on surfaces 122 and 126 of cover 74 to detect the presence of the left and right hands of an operator. Each capacitive sensor may be provided with sensitivity adjustment means such as screw 258 connected to an internal potentiometer that varies the effective range of the capacitive unit, as represented by three dashed ovals concentrically arranged about the face 262 of sensor 252. The largest oval represents a maximum sensitivity setting while the smallest oval represents a lower sensitivity setting. The sensitivity may be lowered to the point where an operator must actually place his hand in contact with surface 262 in order to have the sensor 252 detect the presence of the hand. Suitable adjustable capacitive sensing units are available from Baumer Electric, Ltd. of Southington, Conn.

Figure 8:
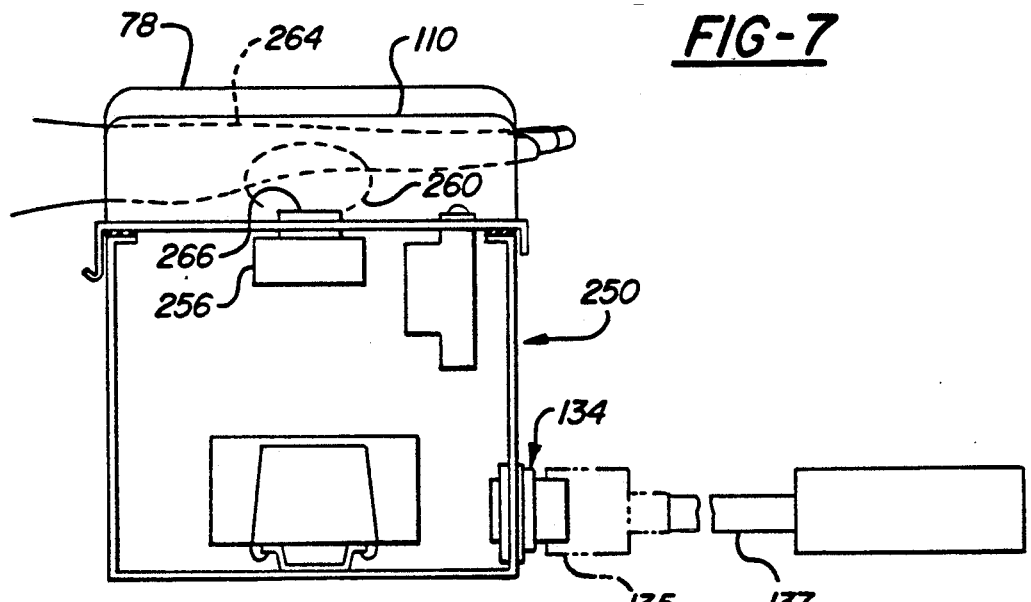
FIG. 8 is a side view of the FIG. 7 apparatus taken along lines 8—8 of FIG. 7.

FIG. 8 shows the run bar 250 from a side cross-sectional view taken along line 8—8 of FIG. 7 and showing oval 260 centered about the vertical central axis of sensing surface 266. FIG. 8 also shows in phantom a connector cable assembly 272 connector 135 and cable 137 attached to the electrical connector 134. As those in the art will appreciate, suitable wires (not shown) extend from connector 134 to the various components and terminals within enclosure 76.

Figure 9:
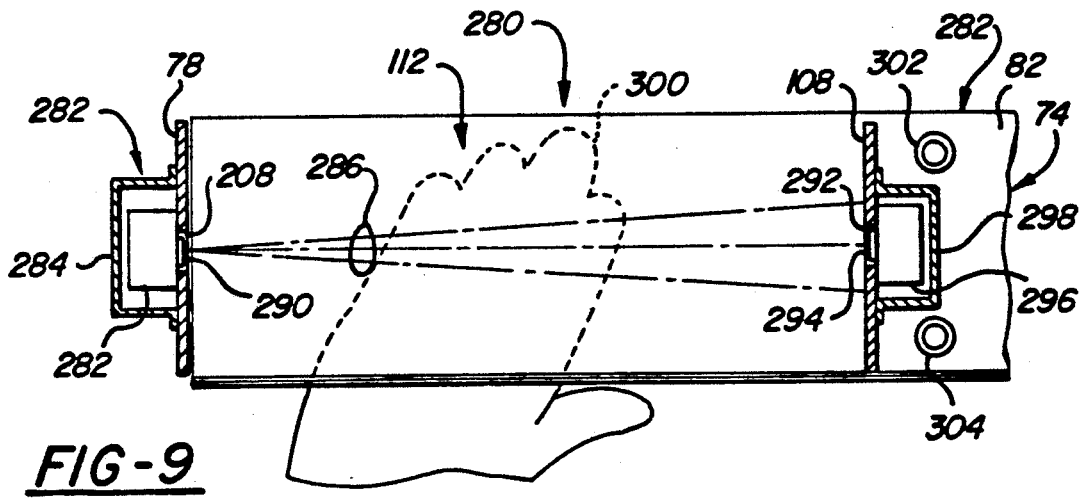
FIG. 9 is a top view of the left-hand portion of a third run bar of the present invention, shown in partial cross-section, which utilizes an ultrasonic sensing system having a separate transmitter and receiver to detect the presence of an operator's hand.

FIG. 9 shows the left section of a third run bar 280 of the present invention which utilizes an ultrasonic sensing system to detect each operator's hand. The central section of the run bar may be identical to central section 114 shown in FIG. 2, and the right section 116 of the run bar 280 is preferably identical to, but a mirror image of, section 112 shown in FIG. 9, and therefore need not be shown.

The ultrasonic sensing system 282 includes an ultrasonic signal sender 283 mounted to the outer guard flange 78 and enclosed by a suitable protective enclosure 284 fastened to the outer surface of guard 78. A directional ultrasonic beam represented by diverging lines 286 emanates through aperture 208 in guard 78 from transducer 290. The ultrasonic beam 286 passes through aperture 292 to the receiving element 294 of ultrasonic receiver protected by a suitable enclosure 298 fastened to the inner guard flange 108. If desired or necessary, the ultrasonic receiver 296 may project up through the surface 82 of the cover 74. A human hand is shown by dashed lines 300, and clearly will break the ultrasonic beam 286 when placed in the position shown or any other appropriate position in left-hand actuation region 112. The indicator lights 138 and 142 shown in FIGS. 1 through 7 may be moved if desired to a more protected location in the central section 114, such as the protected locations indicated by circles 302 and 304. This helps reduce the possibility that the lights would be damaged or worn out due to being rubbed repeatedly by the operator's hands sweeping through the actuation region 112.

FIG. 10 shows left section 112 of another run bar 310 of the present invention which also uses an ultrasonic sensing system to detect the operator's hand. As with run bar 280 shown in FIG. 9, the run bar 310 may have a center section 114 identical to that shown in FIG. 2 and the right section 116 may be identical to, but a mirror image of, the left section 112 shown in FIG. 10. The ultrasonic system 312 is contained in a single module 314 housed in a suitable protective enclosure 316. Sensor 314 is a retro reflective ultrasonic device which sends and receives ultrasonic signals through the aperture 208 in the outer guard 78 via a transmit/receive element 320. Accordingly, a beam 322 emanates in the direction indicated by arrow 324 and strikes the hard vertical surface 118 of inner guard 108 and bounces back as indicated by line 326 in a divergent beam to the outer guard 78, where it strikes the element 320. Thus, the placing of a hand, as shown in FIG. 9, on the flat, horizontal surface 122 of the cover 74 will break the ultrasonic beam. As before, indicator lights 302 and 304 may be provided to respectively indicate when the beam is intact and when the beam is broken. Extensions 328 and 330 may be added at right angles to the vertical surface 118 of the inner guard flange to provide a more protected region for indicator lights in locations 302 and 304 to help protect them against accidental damage. Suitable retro-reflective and thru-beam ultrasonic sensors for the run bars of FIGS. 9 and 10 are available from Baumer Electric, Ltd. of Southington, Conn.

FIG. 11 is a fragmentary front view of a fourth run bar 340 of the present invention which utilizes passive infrared sensing devices 342 and 346 to detect the presence of the operator's left and right hands respectively when they are placed under protective shields 348 and 350. The regions underneath guards 348 and 350 may be called left-hand actuation region 352 and right-hand actuation region 354. Strictly speaking, the left-hand actuation region is defined by an inverted frustum 354 concentrically arranged about the radiation-receiving face 356 of passive intrusion device 342 which represents the volume of space thereby monitored. Similarly, the right-hand actuation region 354 is also a frustum indicated by dashed lines 360 and concentrically arranged about the radiation-receiving face 362 of infrared sensing device 346.

The guard assemblies 348 and 350 represent two possible configurations for shielding or limiting the ability of the passive infrared sensors 342 and 346 to observe temperature differentials far above the surface 82 of the cover 74. The guard assembly 348 includes a substantially horizontal planar member 368, a vertical member 370, side reinforcement members 372 and 374, and an attachment flange 376 which may be welded or otherwise suitably attached to the surface 82 of the cover 74. The upper horizontal member 368 of shield assembly 348 is made from a thermally-opaque material such as metal, opaque plastic or ceramic material so that warmer or cooler objects directly above the sensor 342 will not trigger the sensor. The shield 348 is open on three sides so that an operator may place his hand or fingers within the frustum 356 from three different directions indicated by arrows 378, 380 and 382. The access to the sensor is only blocked from the direction indicated by arrow 384 due to vertical member 370. Indicator lights 386 and 388 may optionally be provided to indicate the absence and pressure respectively of whether an object is detected in the actuation region 352. If desired, the right-hand section 116 of the run bar 340 may be made identical to, but a mirror image of, the left-hand section 112'.

FIGS. 11 and 12 on the right-hand side thereof show the construction of the right shield assembly 350. The shield 350 includes a rearwardly slanted upper member 388, a vertical inner member 390 and a rear vertical member 392, and a horizontal mounting flange 396 attached to the surface 82 of cover 74. The means of attachment may be by mechanical fasteners, epoxy or any other suitable means. The shield 350 is preferably made of a transparent material such as polycarbonate sheet thermally formed into a desired shape. A thermally opaque pad 398 is provided on the upper surface of upper member 388 to prevent passive infrared sensor 346 from detecting temperature changes above the shield 350. As best seen in FIG. 12, this is accomplished by positioning the thermally opaque pad 398 above the sensing face 362 of device 346. Indicator lights 140 and 146 are provided within the shield 350 where they are well protected from accidental damage but can nevertheless be seen since the shield 350 is made out of transparent material. Note that it is not necessary to use a transparent shield since normally the operator will not be watching the indicator lights. Thus, if an opaque shield, made out of metal for example, is used, the need to use a separate thermally opaque pad 398 is eliminated. Further, the operator can simply peer into the open side of the shield 350 to ascertain the state of the indicator lights if desired.

In order to actuate the sensor device 346, an operator must place his fingers into the actuation region 360 by advancing his hand in the direction indicated by arrow 400. Access to the right-hand actuation region 360 from all other directions is blocked by shield members 388, 390 and 392 and outer guard member 116. Typically, in a run bar 340, the guarding used on the left and right sides would be identical. Thus, for example, the guard 350 could be used instead of the guard 348 in the left-hand section 112 of the run bar 340, if desired. Those in the art will also appreciate that the guards 348 or 350 may be employed with all other run bars of the present invention. Further, other shields or configurations of guards are possible for accomplishing the same objective of restricting access to the actuation regions above or along any side of the actuation regions of the run bars of the present invention, if this is desired. Passive infrared intrusion sensors suitable for use in the run bar of FIGS. 11 and 12 are available from Colorado Electro-Optics, Inc. of Boulder, Colo. such as Model IP-37 or later models.

FIGS. 13 and 14 show a fragmentary top view and a cross-sectional view of the left section 112 of a fifth run bar 410 of the present invention. The central section may be identical to the section 114 shown in the run bar of FIG. 2, while the right section may be identical to but a mirror image of the left section shown in FIGS. 13 and 14. The run bar 410 includes two electrical-resistance-sensing systems, one for detecting each hand of the operator. One possible configuration and construction of such a resistance-sensing system 412 is shown in FIGS. 13 and 14. As in FIG. 1, a left-hand actuation region 112 is defined as existing between the outer and inner guard flanges 78 and 108. However, unlike the other non-contact sensors heretofore described, the pushless sensing system 412 must be touched in order to operate. The system 412 includes two electrically isolated conductive plates 414 and 416 spaced from one another and supported on an insulating gasket 418 mounted on the horizontal surface 182 of cover 74. Holes 420 and 422 are provided in the cover 74 so that studs 424 and 426 may extend down therefrom without being grounded out against the cover 74. The conductors within insulated wires 428 and 430 are then respectively connected to the conductor studs 420 and 426, and provided with a suitable loop or excess material to allow for the opening of the cover. The conductors 428 and 430 are run to a resistance-checking module 434 which may be mounted on track 220 if desired. Suitable very low voltage, intrinsically-safe electrical-resistance monitoring modules are available from a number of companies, including Gemco Electric/Magnetek Controls of Clawson, Mich. The output of the module 434 is a suitable level electrical signal indicating when the external resistance between conductive plates 414 and 416 is below some predetermined level, which may be relatively high such as 1 mega-ohm down to a much lower value such as 100 kilo-ohms or 20 kilo-ohms. The resistance through air or the insulator 418 is normally at least two mega-ohms or more. When the operator places his fingers of his left hand 440 on the two plates, a minute, completely harmless current represented by dashed lines 442 will flow between the two plates 414 and 416. Normally, the dry skin resistance of a human being is in the neighborhood of 50 kilo-ohms for clean, low voltage, point-to-point contacts with the skin. Where larger skin areas are involved, the resistance can be less. Further, if the hand 440 is in a glove which is more conductive than skin, the resistance can be less yet. If desired, an operator could wear gloves which have a conductive coating and therefore provide an extremely low resistance path so that the threshold level of sensor module 434 can be set to a very low value such as 1 kilo-ohm. In any event, when the electrical resistance between the two plates 414 and 416 falls beneath a predetermined level, the module 434 reports that the operator's hand is present, by sending an electrical signal out on electrical conductor 444 that is connected to the remainder of the control circuitry of the run bar 410, which will be described shortly. Indicator lights 138 and 142 may be provided and perform the same function as shown in the FIG. 2 embodiment.

FIGS. 15 through 18 show various possible control circuits which may be used with any one of the run bars of the present invention described with respect to FIGS. 1 through 14. The FIGS. 15 through 17 are prepared in relay ladder diagram form, and have line numbers on the left side of the figures which run consecutively for each figure. The line numbers on which the contacts appear have been cross-referenced in listings to the right of the relays that control them, and normally-closed contacts are indicated by underlining in the listing. Also, the timed relay contacts are indicated by the suffix "T" after the line number. Thus, referring to FIG. 15, the relay 1CR is provided with four contacts, including a normally-closed contact and a normally-open contact on line 101. As another example, in FIG. 16, the timer relay 11TR shown in line 203 has a timed contact on line 214 as indicated by the cross-reference ¢214T." In FIG. 17, the timer relay 14TR whose coil is on line 222 has a normally-closed, timed-open contact on line 224 and a normally-open, time-closed contact on line 226. The upward direction of the arrow head on the bottom of both these contact symbols indicate that timer 14TR is an on-delay timer, meaning that the timing begins upon energization of the timer relay coil, and the timed contact switches state when the timed interval is over. With this introduction, the explanation of the operation of this relay ladder logic in FIGS. 15 through 17 should be easier to follow.

The control circuit 500 shown in FIG. 15 represents the simplest of the preferred control circuits for the pushless run bars of the present invention. It may be used with any of the run bars shown in FIGS. 2-14. The control circuit 500 provides relay contact outputs to the control system of the automatic machine that the run bar is to be connected to in order to indicate the current state of the left and right sensors in the left-hand and right-hand actuation regions. The contacts 1CR and 2CR are provided so that the control circuitry of the automatic machines may verify the correct operation of the run bar if desired. The circuit 500 also operates the four indicator lights, such as lights 138, 140, 142 and 146 shown in the run bar 70 in FIG. 2. Details of circuit 500 will now be explained.

On line 100, there is shown the individual electrical contacts of electrical connectors 134 and 135 referred to in FIG. 2 and shown in more detail in FIGS. 6 and 8. Each of the connectors 134 and 135 must have at least eleven pins for the wiring configuration shown on lines 100 and 101. However, this number could easily be reduced by using common wires, such as form-C configurations for the relay contacts 1CR and 2CR. Those in the art will also appreciate that only one 1CR signal and one 2CR signal need be sent, since the inverse signal can be readily generated therefrom if needed.

Power is provided to the control circuit 500 via the wires 501 and 502, which typically provide 115 volt AC power from the control panel of the automatic machine. Other voltage levels such as 24 V.A.C., 6 V.D.C., or the like could be used if desired. The limit switch 1LS is shown held closed on line 102 and 105 represents electrical contacts of the safety switch 230 shown n FIG. 6. Such a safety switch may be used in all run bars of the present invention to help ensure that the cover 74 is closed properly on the base cabinet 76. When it is, 1LS is held actuated as shown in FIG. 15.

The box 504 on line 102 is labeled "1PS" which stands for the first pushless sensor associated with and mounted to or near the left-hand actuation region of each run bar of the present invention. Similarly, the box 506 on line 105 is marked "2PS" for second pushless sensor associated with and mounted to or near the right-hand actuation region of each run bar of the present invention. In other words, pushless sensors 1PS and 2PS generically represent the pushless sensing device and its electrical connections found in any run bar of the present invention. Sensor 1PS receives its electrical power via conductors 508 and 502, and provides an output signal on conductor 510 when the sensor detects an object in the left-hand actuation region. The signal on line 510 energizes the coil of relay 1CR. The light on line 103 is illuminated when the left-hand actuation region, called the "left side" in these control circuit diagrams, is clear, i.e., an object is not detected by the sensor 1PS. The light on line 104 is illuminated when an object is detected on the left side by sensor 1PS. The sensor 2PS operates in the same manner. Electrical power is provided by wires 512 and 502, and when an object is detected an output signal is produced by sensor 2PS on line 514, thus energizing relay coil of relay 2CR. The lights on lines 106 and 107 reflect the status of this object detection process by sensor 2PS.

Those skilled in the art will appreciate that the run bars of the present invention need not have indicator lights, since the automatic machine will function without such lights and need not have a stop button the center section 114 of cover 74, since the automatic machine may operate without it. Also, the "person present" sensor 96 is optional, and can be added to the run bar as desired by those designing the circuitry for operating the automatic machine.

FIG. 16 shows a preferred control circuit 530 of the present invention which includes relay circuitry for accomplishing an anti-tie-down function, and provides relays and indicator lights which show the status of left pushless sensor 1PS and right pushless sensor 2PS. Lines 200 and 201 show the "interlock" contacts and signals provided through electrical connectors 134' and 135' to the control system of the automatic machine that the control circuit and its run bar is associated with. The functions of switch 1LS, left sensor 1PS, right sensor 2PS and the indicator lights on lines 204, 205, 210 and 211 are the same as in the FIG. 15 circuit and thus need not be explained. The anti-tie-down circuit is provided on lines 212 and 213. The normally-closed 11TR and 12TR contacts on line 212 require that the left sensor 1PS and right sensor 2PS both indicate that no object is detected. This ensures that the sensors 1PS and 2PS are functioning properly (i.e., indicating that no object is present when in fact the operator's hands are not in the left or right actuation regions of the run bar). If this is the case, relay 15CR will be de-energized and relay 14CR energizes, and the normally-open contact of relay 14CR on line 213 will seal around the contacts 11TR and 12TR on line 212.

Next, as shown by the logic on line 214, the operator must very nearly simultaneously actuate both the left pushless sensor 1PS and the right pushless sensor 2PS. This immediately closes the first normally-open contacts on line 214. Since relay 14CR was previously energized, power now flows through to wire 540. If neither relay 11TR nor 12TR has been energized for more than the present length of time constituting their respective on-delay periods, electrical power will flow through the two normally-closed, timed-open contacts 11TR and 12TR to conductor 542, thus energizing relay 15CR. This causes the normally-closed contact 15CR on line 212 to open, which de-energizes relay 14CR. The normally-open contact 15CR on line 215 also simultaneously seals around three contacts on line 214, so that when timers 11TR and 12TR time out and relay 14CR de-energizes, the relay 15CR will remain energized. Note that as soon as either sensor 1PS or sensor 2PS no longer detects a signal, the corresponding contact of relay 11TR or relay 12TR on line 214 will open, thus de-energizing relay 15CR. Note that the interlock contacts o line 201 provide the control system of the automatic machine with the status of relays 11TR, 12TR, 14CR and 15CR. The length of the on-delay periods of timer relays 11TR and 12TR determine how nearly simultaneously to one another the devices 1PS and 2PS must be actuated. The on-delay periods are preferably identical, and may be in any suitable value, such as 0.1 second to 1.0 second. The "test lights" button 86 is used to provide a signal via wire 544 to the test terminal of all the conventional indicator lights.

FIG. 17 shows a further control circuit 550 to be used in conjunction with the portions of circuit 530 shown on lines 200 through 211. In other words, the control circuit 550, when used, replaces the control circuit shown on lines 212 through 215 of FIG. 16. The box 554 on line 220 of FIG. 17 generically represents the third pushless sensor, such as sensor 96, located on the face 100 of the base cabinet 72. In other words, the sensor 3PS detects the presence of an object in front of the run bar with which the circuit 550 is being used. As previously explained, the senor 96 detects the presence of the operator who is to use the run bar.

The indicator light on line 221 is the indicator light 90 shown in FIG. 2, and when illuminated, indicates that sensor 3PS has detected the presence of a person. Only when sensor 3PS is activated can the anti-tie-down timer relay 14TR and the start signal relay 15CR be energized in circuit 550. This result is produced by the normally-open contact 13CR found on line 522. When the person is present, and the first and second sensors 1PS and 2PS indicate no object is present in their respective hand actuation regions, the normally-closed contacts 11TR, 12TR and 15CR on line 220 will be closed, thus allowing power to flow to the coil of relay 14TR. Seal contact 14TR on line 223 allows 14TR to remain energized even after the sensor 1PS or 2PS detects an object.

The logic on line 224 required to energize 15CR is the same as that shown on line 214 of FIG. 16 with one exception, namely, the use of the normally-closed on-delay timer contact of relay 14TR. This timed relay contact effectively monitors the length of time that relay 13CR has been energized without a start signal being produced. In other words, an operator must not be standing in front of the run bar for an inordinate amount of time before producing a start signal. The length of the on-delay time period of relay timer 14TR will vary depending upon the applications. Typically, I would expect that this time delay would be set in the range between about 30 seconds and about three to five minutes. In the event that an operator has been standing in front of the run bar employing the FIG. 17 control circuit for more than the predetermined length of on-delay period of timer 14TR, the normally-closed timed-open contact of timer 14TR on line 224 will open, thus preventing energization of relay 15CR. Simultaneously, the normally-open timed-closed contact on line 226 will close, thus illuminating indicator light 94, so that the operator will understand why the run bar will not produce a start signal. In order to reset the circuit, the operator only needs to step away from the run bar so that the sensor 3PS does not produce an output, which will de-energize relay 13CR. This automatically resets timer relay 14TR. Thereafter, the operator may immediately step back up to the run bar and produce a start signal via relay 15CR by actuating pushless sensors 1PS and 2PS within the time limit established by the on-delay period of timer relay 14TR. The use of timer 14TR thus helps ensures that the third sensor 3PS is working properly, has not been "tied down," that is, permanently actuated. Suitable electromechanical or solid-state relays with or without solid-state timers for implementing the control circuits shown in FIGS. 15-18 are available from may different companies, in various sizes, price ranges and operating voltages. One such company is Potter & Brumfield in Princeton, Ind., and another is MTE Ltd., of Essex, England.

Figure 18:
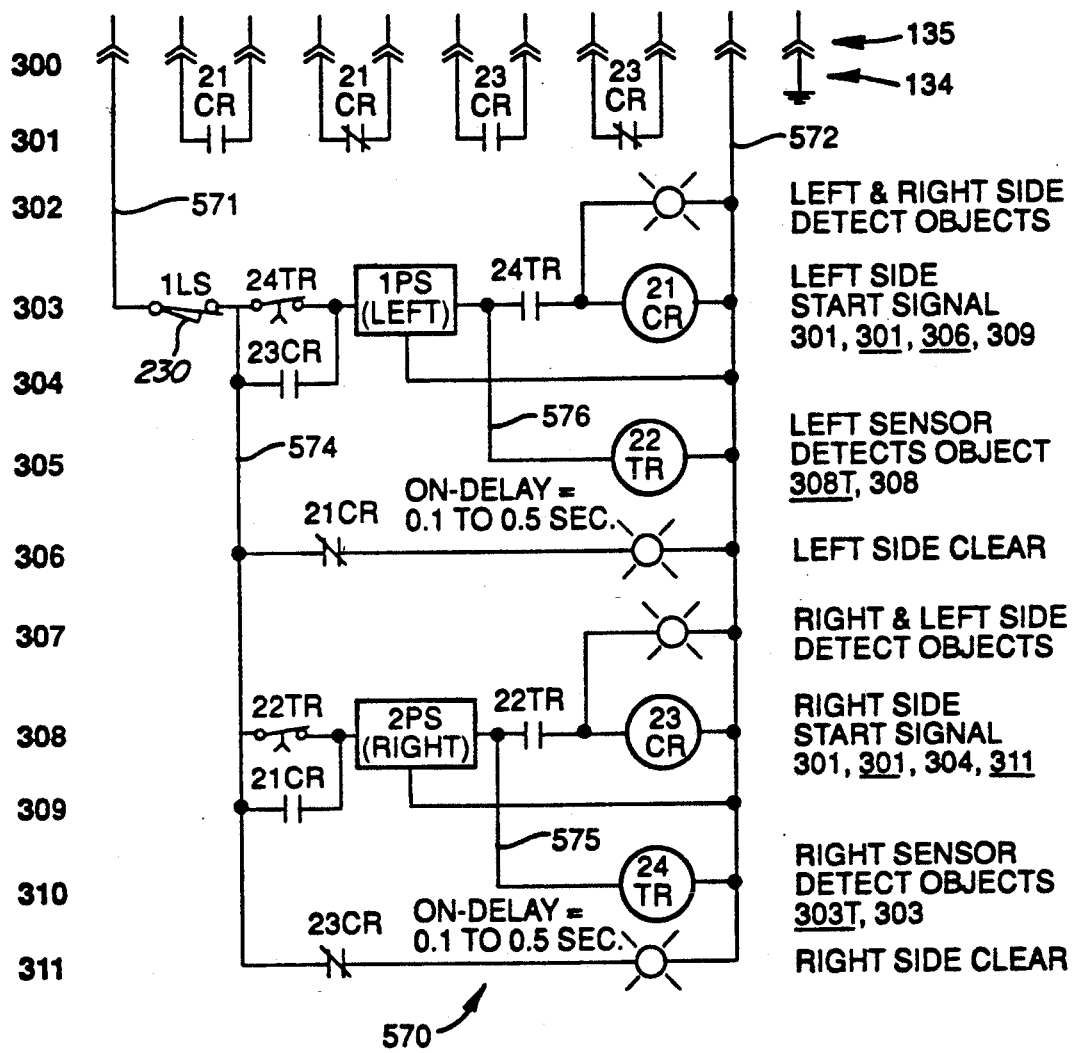
FIG. 18 is a third control circuit used in the various run bars of the present invention.

FIG. 18 shows a preferred control circuit 570 of the present invention which includes relay circuitry for accomplishing an anti-tie-down function, and provides indicator lights which show the status of right pushless sensor 1PS and right pushless sensor 2PS. Lines 300 and 301 show the interlock contacts and signals provided by the electrical connectors 134 and 135 to the control system of the automatic machine that the control circuit 570 and its run bar is associated with. The function of switch 1LS, left sensor 1PS and right sensor 2PS are the same as in the FIG. 15 circuit and thus need not be explained. The anti-tie-down circuit is provided by the circuitry shown on lines 303-305 and 308-310. In order for the normally-closed, timed-open contact 24TR on line 303 to be closed, the pushless sensor 2PS on line 303 must be open so that power cannot flow to line 575 which feeds power to the coil of timer 24TR on line 310. Similarly, in order for the normally-closed, timed-open contact 22TR on line 308 to be closed, the pushless sensor on 1PS on line 303 must not be feeding power through to line 576 which is connected to the coil of timer 22TR on line 305. The preferred time delay on timers 22TR and 24TR are in the range of 0.1 second to 0.5 second, and both timers should be set for the same amount of time. When an object is detected by either sensor 1PS or 2PS, its respective timer 22TR or 24TR will very quickly time out, thus opening up the normally-closed, timed-open contact connected to the circuitry associated with the other pushless sensor. Once such timed-open contact is open, it inhibits any start signal from the relay of the other sensor from being produced, as will be made clear from the description of circuit 570 which follows.

In order for the run bar to produce the necessary start signals to the automatic machine, relays 21CR and 23CR must be both energized simultaneously. This can only happen if both pushless sensors 1PS and 2PS are actuated nearly simultaneously, that is, within the predetermined time delay set on timers 22TR and 24TR. If both pushless sensors 1PS and 2PS are actuated nearly simultaneously, then power is able to flow from wire 574 through the normally-closed contact 24TR on line 303 to sensor 1PS, through to line 576. Also, power is able to flow from conductor 574 through normally-closed contact TR24 on line 308 to the right pushless sensor 2PS to wire 575. Thus, relay coils 22TR and 24TR are energized. This closes the normally-open contact 22TR on line 308 and the normally-open 24TR on line 303, thus energizing the coils of relays 21CR and 23CR. When relay 23CR is energized, the seal contact 23CR on line 304 closes, thus allowing sensor 1PS to remain powered, even when timer 24TR times out. Similarly, when the normally-open seal contact 21CR on line 309 closes, this allows power to remain applied to right sensor 2PS on line 308 even though timer 22TR times out. Hence, relays 21CR and 23CR will then remain closed as long as objects are detected by sensors 1PS and 2PS. The indicator lights on lines 302 and 307 will then both be illuminated. These lights may respectively be located where indicator lights 142 and 146 are shown in FIG. 2. When relays 21CR and 23CR are de-energized, the indicator lights on lines 306 and 311 will be illuminated instead. The locations of these lights may correspond to indicator lights 138 and 140 shown in FIG. 2.

Figure 19:
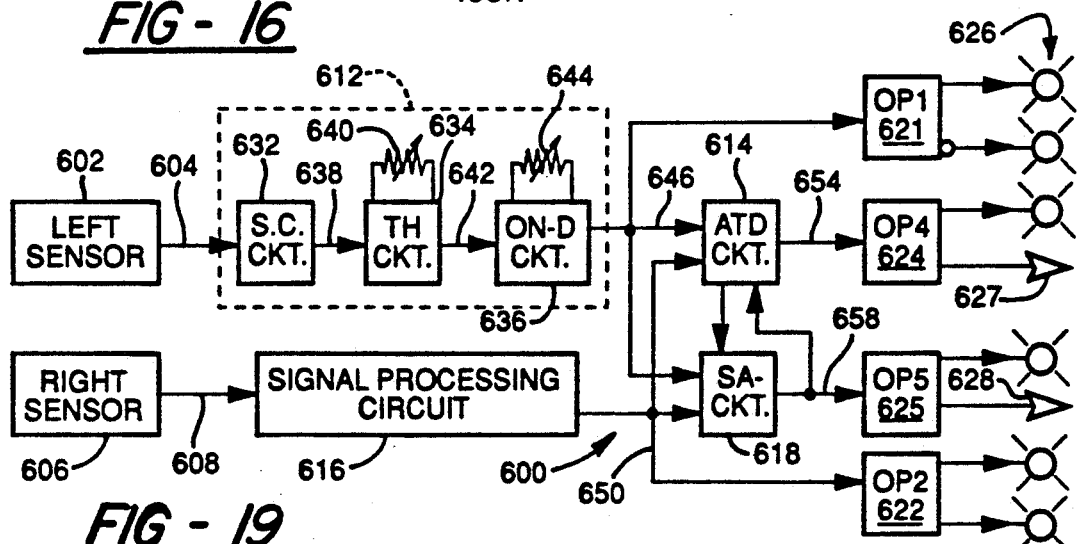
FIG. 19 is a general block diagram of a solid-state electronic control circuit usable in any of the run bars of the present invention shown in FIGS. 1 through 14.

Although the control circuits of FIGS. 15-18 are shown in relay form, those skilled in the art will appreciate that the control circuits may also be implemented in a solid-state electronic form using discrete components, integrated circuits and/or a programmed microcontroller having a suitable number of input and output ports and a suitable amount of memory to accept a small control program to implement the logic and timing functions shown in one or more of the control circuits in FIGS. 15-18. FIG. 19 is a simplified block diagram of a general approach which may be used to implement the control circuits of FIGS. 15-18 using discrete solid-state electronic components and/or a microcontroller. FIG. 19 shows a control system 600 which includes left-hand and right-hand pushless sensors 602 and 606 which respectively produce analog signals on signal paths 604 and 608 for delivery to signal processing circuit blocks 612 and 616. The sensor 602 and 606 are preferably identical, as are the signal processing circuits 612 and 616. The control system 600 also includes an anti-tie-down ("ATD") circuit module 614 and a simultaneous actuation ("SA") circuit or block 618, and four output modules 621, 622, 624 and 625, all interconnected as shown. The various output modules 621-625 may each drive one or more indicator lights 626 and may provide or interface signals to the control system of an automatic machine, such as are indicated by output signals 627 and 628, or may drive relays to provide interlock contacts to the automatic machine.

The signal processing circuit 612 preferably includes three separate functions, namely a signal conditioning function performed by block 632, a threshold function performed by block 634 and an on-delay function performed by block 636. The analog signal from sensor 602 is provided via path 604 to the signal conditioning circuit 632 which scales, offsets and/or smooths out the raw analog signal on path 604, in order to provide a filtered analog output signal on line 638 to the threshold block 634, which may include a manual adjustment such as potentiometer 640. The block 634 includes a threshold level set by potentiometer 640, and a comparator which decides whether the filtered signal on path 638 is above or below the threshold level set by pot 640. When the signal on path 638 exceeds (or falls below) the minimum (maximum) level indicating positively the detection of the presence of an operator's hand by sensor 602, block 634 outputs a digital signal on line 642 indicating that sensor 602 has detected an object. The on-delay circuit 636 then makes sure that this signal on line 642 is present for a predetermined minimum time, such as 50 milliseconds, 100 milliseconds or longer, in order to ensure that the filter signal 638 is not transient signal. An adjustment means such as pot 644 may be provided to set the required on-delay to any desired time period. Once this on-delay time period has elapsed with the signal 642 remaining continuously present, an output signal is provided on path 646 to the anti-tie-down circuit 614 and the simultaneously actuation circuit 618.

The signal processing circuit 616, associated with the right-hand sensor 606, functions in the same manner as signal processing circuit 612, in order to produce an output signal on line 650 indicating whether an object has been detected by the right sensor 606. The signals on line 646 and 650 are then provided to the anti-tie-down block 614 and simultaneous actuation block 618 for processing. Block 614 and 618 each produce their own output signal on line 654 and 658, which drives modules 624 and 625 respectively. The blocks 614 and 618 are used to implement the logic and timing functions described in either FIG. 16 with respect to lines 212 through 215, or FIG. 17 with respect to lines 222 through 226. Armed with the foregoing description of the control system 600 and logic and timing functions of the control circuits shown in FIGS. 15–18, those skilled in the industrial electronic controls design arts will readily be able to design and construct a suitable signal processing circuit 612 (including signal conditioning circuit 632, threshold comparison circuit 634, and on-delay circuit 636), a suitable ATD circuit 614 and SA circuit 618 without difficulty. Thus, the details of the individual circuits need not be discussed here, except to note that the signal processing circuit can be readily adapted or modified to be used with any type of pushless sensor in order to achieve reliable sensing of an operator's hands. Similarly, those in the art will readily appreciate that the above-described signal processing, logic and timing functions can all be accomplished using a programmed microcontroller which has at least one analog-to-digital converter.

Preferred dimensions for the base cabinet 76 of the run bars of the present invention are about 75 cm long by about 10 cm high by about 10 cm wide. The outer guard flanges may be about 20 cm high from the bottom of the base cabinet and about 10 cm wide. Preferred dimensions for the inner guard flanges are about 5 cm high and 10 cm wide. A preferred distance between the inner and outer guard flanges of the left or right section is about 15 cm to about 20 cm. However, other suitable sizes of elongated cabinets, covers and guards may be used. For durability in factory environments, I prefer to make the cover and base cabinets of the present invention out of 10 gauge (0.32 cm) steel sheet, although other thicknesses of steel and/or metals like aluminum sheet may be utilized. The overall enclosure is preferably painted with a bright color such as a safety yellow commonly used in factories as a "caution" color. The cover and/or the base cabinet may also be made out of rigid high-impact strength plastic or out of composite materials.

Those skilled in the art will appreciate that various features disclosed with respect to one embodiment of the invention may be used with other embodiments of the present invention, as long as the features are not incompatible with one another. For example, the indicator lights, the actuation region shielding, the electrical interlock which detects the "cover not in its closed position" condition, the in-cabinet control circuitry, and/or the additional centrally-located operator detection device, may be provided on any embodiment of the run bars of the present invention, as desired or necessary for a given application.

The foregoing detailed description shows that the preferred embodiments of the present invention are well suited to fulfill the objects state above. It is recognized that those skilled in the art may make various modifications or additions to the preferred embodiments chose to illustrate the present invention without departing from the spirit and proper scope of the invention. For example, although it is most economical and convenient to provide a cover assembly made from a single sheet of metal so that the entire cover may be opened at once, it is possible to fabricate a cover assembly out of two or more sheets of metal or plastic. Where separate sections of the cover are provided, they could be individually opened, and could have separate interlock switches as well. Further, the base cabinet, instead of having one large internal chamber, may be fabricated with multiple chambers, such as left and right chambers for housing the left and right pushless sensor mechanisms respectively. A central section of the base cabinet for housing control circuit devices such as the anti-tie-down circuitry may be provided if desired. Alternatively, such a central section and chamber of the base cabinet may be omitted if desired, especially if the control circuits just mentioned are located elsewhere. Also, still other guarding arrangements may be used to make it even more difficult to inadvertently actuate the pushless sensing mechanisms or run bar may be varied. Further, the type of output signals provided by the pushless sensing mechanisms. For example, instead of electrical output signals, it may be desirable to produce optical output signals which are delivered through optical fibers to a remotely located control system of the automatic machine with which the run bar is used. Accordingly, it is to be understood that the protection sought and to be afforded hereby should be deemed to extend to the subject matter defined by the appended claims, including all fair equivalents thereof.

I claim:

1. A two-hand pushless run bar apparatus for operating an automatic machine, comprising:

an elongated enclosure assembly having (1) a generally rectangular elongated cover with a generally planar exterior surface and divider means for separating the cover into left, central and right sections, with the left and right sections being spaced apart from each other by at least about thirty centimeters, (2) a base cabinet having at least one internal chamber, and front and rear top edges running in the direction of the length of the cabinet, (3) hinge means, located along a first one of the top edges of the base cabinet, for interconnecting the cover and cabinet along one of the top edges of the base cabinet so that the cover is pivotable between a closed position which blocks access to the internal chamber of the cabinet and an open position which permits access to the internal chamber of the cabinet; (4) fastener means, located along a second one of the top edges of the base cabinet, for holding the cover in its closed position;

left and right outer guard flanges respectively extending above the cover from the left and right ends of the base cabinet, and which together with divider means for separating the cover into left and right sections, constitute physical boundaries for left hand and right actuation regions;

first pushless sensor means, located at least in part in the vicinity of the left hand actuation region, for sensing whether a first human hand is present in the immediate vicinity directly above the left section of the cover, the first pushless sensor means including means for generating a first signal indicating whether such hand is present; and second pushless sensor means, located at least in part in the vicinity of the right hand actuation region, for sensing whether a second human hand is present in the immediate vicinity directly above the right section of the cover, the second pushless sensor means including means for generating a second signal indicating whether such hand is present.

2. A two-hand run bar apparatus as in claim 1, wherein the divider means of the cover include left and right inner guard flanges which each have a substantially vertical surface extending at least about two centimeters above the surface of the cover, with vertical surfaces of the left and right inner flanges being located no more than about twenty centimeters from the left and right outer guard flanges respectively, thereby defining a left hand actuation region located between the left inner and outer guard flanges, and a right hand actuation region located between the right inner and outer guard flanges.

3. A two-hand run bar apparatus as in claim 2, further comprising:
a rigid left shield member attached to the left section of the cover and movable therewith, which has an upper portion disposed at least about two centimeters above the cover and extends substantially between the inner and outer guard flanges located on either side of the left hand actuation region, and
a rigid right shield member attached to the right section of the cover and movable therewith, which has an upper portion thereof disposed at least about two centimeters above the cover which extends substantially between the inner and outer guard flanges located on either side of the right hand actuation region.

4. A two-hand run bar apparatus as in claim 1, further comprising:
left indicator light means, mounted to and movable with the cover of the run bar apparatus in the vicinity of the left hand actuation region, for indicating when the first pushless sensor means detects an object in the left hand actuation region, and
right indicator light means, mounted to and movable with the cover of the run bar apparatus in the vicinity of the right hand actuation region, for indicating when the second pushless sensor means detects an object in the right hand actuation region.

5. A two-hand run bar apparatus as in claim 4, wherein:
the left indicator light means includes a plurality of indicator light devices, with a first such light device indicating when illuminated that the left pushless sensor means detects an object within the left hand actuation region, and a second such light device indicating when illuminated that the first pushless sensor means does not detect an object within the left hand actuation region, and
the right indicator light means includes a plurality of indicator light devices, with one such device indicating that the right pushless sensor means detects an object within the right hand actuation region, and another such light device indicating when illuminated that the second pushless sensor means does not detect an object within the right hand actuation region.

6. A two-hand run bar apparatus as in claim 3, wherein:
left and right sections of the cover each include a generally rectangular planar surface at lest fifteen centimeters wide disposed between its inner and outer guard flanges, and
the first and second light devices of each of the indicator light means are miniature light devices spaced from one another and mounted to the generally rectangular planar surface of the cover associated with its respective actuation region.

7. A two-hand run bar apparatus as in claim 1, further comprising:
left shield means, mounted to the cover of the run bar apparatus in the vicinity of the left hand actuation region, for at least partially blocking access to the left hand actuation region from a route directly above the region, and
right shield means, mounted to the cover of the run bar apparatus in the vicinity of the right hand actuation region, for at least partially blocking access to the right hand actuation region from a route directly above the region.

8. A pushless run-bar apparatus as in claim 1, wherein the first and second pushless sensor means each employ a substantially identical non-contact sensor system.

9. A two-hand run bar apparatus as in claim 8, wherein each non-contact sensor system includes a photo-transmitter device and a photo-receiver device.

10. A two-hand run bar apparatus as in claim 8, wherein each non-contact sensor system includes a capacitive sensor having a range of at least about one-half inch.

11. A two-hand run bar apparatus as in claim 8, wherein each non-contact sensor system includes an ultrasonic transmitter and an ultrasonic receiver.

12. A two-hand run bar apparatus as in claim 8, wherein each non-contact sensor system includes a passive infrared intrusion device.

13. A pushless run-bar apparatus as in claim 1, wherein the first and second pushless sensor means each employ a substantially identical contact sensor system, which includes at least one capacitive sensor.

14. A two-hand run bar apparatus as in claim 1, wherein the enclosure assembly has only one internal chamber, which extends along below and substantially over the entire length of the cover assembly.

15. A two-hand run bar apparatus as in claim 13, wherein the enclosure assembly when the cover assembly is in its closed position upon the base cabinet, has a generally rectangular cross-section perpendicular to the longitudinal axis of the base cabinet.

16. A two-hand run bar apparatus as in claim 1, further comprising:
electrical interlock means, mounted within the internal chamber of the base cabinet, for disabling the run bar apparatus when the cover assembly is not its closed position.

17. A two-hand run bar apparatus as in claim 16, further comprising:
an electrical wiring harness assembly including multiple conductors and at least one multiple-conductor electrical connector; and terminal block means located in the base cabinet, for facilitating easy connection of conductors from the first and second pushless sensor means and the electrical wiring harness assembly.

18. A two-hand run bar apparatus as in claim 17, further comprising:
anti-tie-down circuitry means, located within the internal chamber of the base cabinet, electrically connected to and monitoring operation of the first and second pushless sensor means, for producing a start signal and an anti-tie-down signal, for delivery to the automatic machine via the electrical wiring harness assembly.

19. A two-hand pushless run bar apparatus for operating an automatic machine, comprising:
an elongated enclosure assembly having (1) a generally planar elongated rectangular cover with left and right ends and having a left hand actuation region near the left end of the cover, and a right hand actuation region near the right end of the cover the two actuation regions being physically separated by at least about 30 centimeters, (2) a base cabinet having elongated walls forming part of at least one internal chamber and running the length of the cabinet, (3) hinge means, located along a first one of the elongated walls of the base cabinet, for interconnecting the cover to the cabinet so that the cover is pivotable between a closed position which blocks access to the internal chamber of the cabinet and an open position which permits access to the internal chamber; (4) fastener means, located along a second one of the elongated walls of the base cabinet, for holding the cover in its closed position;
left guard means, mounted on and movable with the cover and located over the left hand actuation region, for blocking access to such actuation region from directly above and from at least the right side of the left hand actuation region, the left guard means including at least top barrier member mounted in fixed position generally within a range of about three centimeters to about fifteen centimeters of the cover;
right guard means, mounted on and movable with the cover and located over the right hand actuation region, for blocking access to such actuation region from directly above and from at least the left side of the right hand actuation region, the right guard means including at least top barrier member mounted in fixed position generally within a range of about one inch to about six inches of the cover;
first pushless sensor means, located at least in part in the vicinity of the left hand actuation region, for sensing whether a human hand is present in the left hand actuation region beneath the top barrier member of the left guard means, the first pushless sensor means including means for generating a first signal indicating whether such hand is present; and
second pushless sensor means, located at least in part in the vicinity of the right hand actuation region, for sensing whether a human hand is present in the right hand actuation region beneath the top barrier member of the right guard means, the second pushless sensor means including means for generating a second signal indicating whether such hand is present.

20. A two-hand run bar apparatus as in claim 19, wherein:

the left guard means includes an inner guard flange which has a substantially vertical surface extending at least two centimeters above the surface of the cover, and which is located no more than about fifteen centimeters from the left end of the cover;
the right guard means includes an inner guard flange which has a substantially vertical surface extending at least two centimeters above the surface of the cover, and which is located no more than about fifteen centimeters from the right end of the cover; and wherein the apparatus further comprises
left and right outer guard flanges respectively extending above the cover from the left and right ends of the base cabinet, and are each provided with an aperture centrally located no more than about five centimeters above the cover when the cover is in its closed position,
left and right reflectors respectively mounted on the substantially vertical surfaces of the left and right inner guard flanges and respectively facing the left and right outer guard flanges;
the left pushless sensor means includes a retro-reflective photo-transceiver mounted upon the left outer guard flange to project an optical beam through the aperture thereof toward the left reflector; and
the right pushless sensor means includes a retro-reflective photo-transceiver mounted upon the right outer guard flange to project an optical beam through the aperture thereof toward the right reflector.

21. A two-hand pushless run bar apparatus for operating an automatic machine, comprising:
an elongated enclosure assembly (1) an elongated cover having left and right inner guards extending therefrom and separating the cover into left, central and right sections, with the left and right sections being at least spaced apart from each other by at least about thirty centimeters, and (2) a base unit having at least one chamber and attached to the cover;
left and right outer guard flanges respectively extending above the cover from the left and right ends of the base unit, which together with the left and right inner guards define physical side boundaries for left and right actuation regions;
first optical transceiver means, located at least in part adjacent to the left outer guard of the base cabinet, for optically sensing whether a human hand is present in the immediate vicinity directly above the first section of the cover, the first transceiver means including means for generating a first signal indicating whether such hand is present;
second optical transceiver means, located at least in part adjacent to the right outer guard of the base unit, for optically sensing whether a human hand is present in the immediate vicinity directly above the second section of the cover, the second transceiver means including means for generating a second signal indicating whether such hand is present.

22. A two-hand run bar apparatus as in claim 21, wherein:
the left and right outer guards each include an aperture therein; and
the first optical transceiver means includes a retro-reflective photo-transceiver mounted to the left outer guard to project an optical beam through the aperture thereof, with the optical beam being oriented to detect a hand; and the second optical transceiver means includes a retro-reflective photo-transceiver mounted to the right outer guard to project an optical beam through the aperture thereof, with the optical beam being oriented to detect a second hand.

23. A two-hand pushless run bar apparatus for operating an automatic machine, comprising:

an enclosure assembly having an elongated base cabinet and elongated cover pivotally movable with respect to the base cabinet, the enclosure having left and right sections and left boundary means for signifying to an operator a location of a left hand actuation region associated with the left section of the enclosure assembly, right boundary means for signifying to an operator a location of a right hand actuation region associated with the right section of the enclosure assembly, with the left and right actuation regions being above the cover and spaced apart from each other by at least about thirty centimeters;

first capacitive sensing means, mounted to the enclosure assembly, for sensing via a changing capacitance condition whether a first human is present in the left hand actuation region, the first capacitive sensing means including means for generating a first signal indicating whether such hand is present; and second capacitive sensing means, mounted to the enclosure assembly, for sensing via a changing capacitance condition whether a second human hand is present in the left hand actuation region, the second capacitive sensing means including means for generating a second signal indicating whether such hand is present.

24. A two-hand run bar apparatus as in claim 23, wherein:

the left boundary means includes left guard means, located over the left hand action region, for blocking access to such actuation region from directly above and at least from the right side of the left hand actuation region; and the right boundary means includes right guard means, located over the right hand action region, for blocking access to such actuation region from directly above and from the right side of the right hand actuation region.

25. A two-hand run bar apparatus as in claim 23, wherein:

the first and second capacitive sensing means each include a capacitive sensing device which must be touched in order to indicate the presence of a human hand.

26. A two hand pushless run bar apparatus for operating an automatic machine, comprising:

an enclosure assembly having an elongated base cabinet and elongated cover pivotally movable with respect to the base cabinet, the enclosure assembly having left and right sections and left boundary means for signifying to an operator a location of a left hand actuation region associated with the left section of the enclosure assembly, right boundary means for signifying to an operator a location of a right hand actuation region associated with the right section of the enclosure assembly, with the left and right actuation regions being above the cover and spaced apart from each other by at least about thirty centimeters;

first ultrasonic sensing means, mounted to the enclosure assembly, for sensing via a changing acoustical condition whether a first human hand is present in the left hand actuation region, the first ultrasonic sensing means including means for generating a first signal indicating whether such hand is present; and second ultrasonic sensing means, mounted to the enclosure assembly, for sensing via a changing acoustical condition whether a second human hand is present in the left hand actuation region, the second ultrasonic sensing means including means for generating a second signal indicating whether such hand is present.

27. A two-hand run bar apparatus as in claim 26, wherein:

the left boundary means includes left guard means, located over the left hand action region, for blocking access to such actuation region from directly above and from the right side of the left hand actuation region; and the right boundary means includes right guard means, located over the right hand action region, for blocking access to such actuation region from directly above and from the right side of the right hand actuation region.

28. A two-hand pushless run bar apparatus for operating an automatic machine, comprising:

an enclosure assembly having an elongated base cabinet and elongated cover pivotally movable with respect to the base cabinet, the enclosure assembly having left and right sections and left boundary means for signifying to an operator a location of a left hand actuation region associated with the left section of the enclosure assembly, right boundary means for signifying to an operator a location of a right hand actuation region associated with the right section of the enclosure assembly, with the left and right hand actuation regions being above the cover and spaced apart from each other by at least about thirty centimeters;

first passive infrared intrusion means, mounted to the enclosure assembly, for sensing via a changing thermal condition whether a first human hand is present in the left hand actuation region, the first transceiver means including means for generating a first signal indicating whether such hand is present; and second passive infrared intrusion means, mounted to the enclosure assembly, for sensing via a changing thermal condition whether a second human hand is present in the left hand actuation region, the second transceiver means including means for generating a second signal indicating whether such hand is present.

29. A two-hand run bar apparatus as in claim 28, wherein:

the left boundary means includes left guard means, located over the left hand action region, for blocking access to such actuation region from directly above and from the at least right side of the left hand actuation region, the left guard means including at least a thermally opaque top barrier member, mounted in fixed position less than about twenty centimeters from the first passive infrared intrusion sensing device, for preventing detection of changing thermal conditions thereabove by the first passive infrared intrusion means; and the right boundary means includes right guard means, located over the right hand action region, for blocking access to such actuation region from directly above and from at least the left side of the right hand actuation region, the right guard means including at least a thermally opaque top barrier member, mounted in fixed position less than about twenty centimeters from the second passive infrared intrusion sensing device, for preventing detection of changing thermal conditions thereabove by the second passive infrared intrusion means.

30. A two-hand pushless run bar apparatus for operating an automatic machine, comprising:

an enclosure assembly having an elongated base cabinet and elongated cover pivotally movable with respect to the base cabinet, the enclosure assembly having left and right sections and left boundary means for signifying to an operator a location of a left hand actuation region associated with the left section of the enclosure assembly, right boundary means for signifying to an operator a location of a right hand actuation region associated with the right section of the enclosure assembly, with the left and right hand actuation regions being above the cover and spaced apart from each other by at least about thirty centimeters;

first electrical resistance sensing means, mounted to the enclosure assembly, for sensing via a changing electrical resistance condition produced by physical contact without pushing whether a first human hand is present in the left hand actuation region, the first electrical resistance sensing means including means for generating a first signal indicating whether such hand is present; and second electrical resistance sensing means, mounted to the enclosure assembly, for sensing via a changing electrical resistance condition produced by physical contact without pushing whether a second human hand is present in the left hand actuation region, the second electrical resistance sensing means including means for generating a second signal indicating whether such hand is present.

31. A two-hand run bar apparatus as in claim 30, wherein:

the left boundary means includes left guard means, located over the left hand action region, for blocking access to such actuation region from directly above and from the right side of the left hand actuation region; and the right boundary means includes right guard means, located over the right hand action region, for blocking access to such actuation region from directly above and from the right side of the right hand actuation region.

* * * * *

UNITED STATES PATENT AND TRADEMARK OFFICE
CERTIFICATE OF CORRECTION

PATENT NO. : 5,168,173
DATED : December 1, 1992
INVENTOR(S) : David E. Windsor

It is certified that error appears in the above-indentified patent and that said Letters Patent is hereby corrected as shown below:

Column 1, line 38, replace "rub" with --run--.

Column 1, line 61, replace "of" with --or--.

Column 2, line 45, replace "present" with --presence--.

Column 2, line 50, replace "contracted" with --contacted--.

Column 3, line 60, delete "the".

Column 4, line 1, replace "used" with --uses--.

Column 4, line 5, replace "systems" with --system--.

Column 4, line 56, replace "fragmentary" with --perspective--.

Column 12, line 16, replace "in" with --on--.

Column 12, line 18, replace "¢" with --"--.

Column 12, line 39, replace "machines" with --machine--.

Column 12, line 61, replace "n" with --in--.

Column 14, line 10, replace "o" with --on--.

Column 15, line 63, replace "TR24" with --24TR--.

Column 16, line 33, replace "sensor" with --sensors--.

Column 16, line 68, after "not" insert --a--.

UNITED STATES PATENT AND TRADEMARK OFFICE
CERTIFICATE OF CORRECTION

PATENT NO. : 5,168,173

DATED : December 1, 1992

INVENTOR(S) : David E. Windsor

It is certified that error appears in the above-indentified patent and that said Letters Patent is hereby corrected as shown below:

Column 17, line 6, replace "simultaneously" with --simultaneous--.

Column 17, line 50, replace "cabinets" with --cabinet--.

Column 18, line 5, replace "state" with --stated--.

Column 18, line 7, replace "chose" with --chosen--.

Column 18, line 31, after "mechanisms" insert --may be varied--.

Column 18, line 68, Claim 1, after "right" insert --hand--.

Column 22, line 33, Claim 21, after "assembly" insert --having--.

Column 22, line 41, Claim 21, replace "guard flanges" with --guards--.

Column 23, line 24, Claim 23, after "human" insert --hand--.

Column 24, line 18, Claim 27, replace "action" with --actuation--.

Column 24, line 23, Claim 27, replace "action" with --actuation--.

Column 24, line 59, Claim 29, replace "action" with --actuation--.

UNITED STATES PATENT AND TRADEMARK OFFICE
CERTIFICATE OF CORRECTION

PATENT NO. : 5,168,173
DATED : December 1, 1992
INVENTOR(S) : David E. Windsor

It is certified that error appears in the above-indentified patent and that said Letters Patent is hereby corrected as shown below:

Column 25, line 2, Claim 29, replace "action" with --actuation--.

Column 25, line 24, Claim 30, after "right" delete --hand--.

Column 26, line 19, Claim 31, replace "action" with --actuation--.

Column 26, line 24, Claim 31, replace "action" with --actuation--.

Signed and Sealed this

Twenty-fifth Day of October, 1994

Attest:

BRUCE LEHMAN

Attesting Officer     Commissioner of Patents and Trademarks